United States Patent
Oved et al.

(10) Patent No.: US 11,956,073 B2
(45) Date of Patent: Apr. 9, 2024

(54) TECHNIQUES FOR A MULTIPLE INCREMENTAL REDUNDANCY RETRANSMISSION SCHEME

(71) Applicant: QUALCOMM Incorporated, San Diego, CA (US)

(72) Inventors: Tal Oved, Modiin (IL); Gideon Shlomo Kutz, Ramat Hasharon (IL); Assaf Touboul, Netanya (IL); Michael Levitsky, Rehovot (IL); Alexander Vladimir Sverdlov, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/302,294

(22) Filed: Apr. 29, 2021

(65) Prior Publication Data
US 2022/0353010 A1    Nov. 3, 2022

(51) Int. Cl.
*H04L 1/00* (2006.01)
*H04L 5/00* (2006.01)
*H04W 72/20* (2023.01)

(52) U.S. Cl.
CPC .......... *H04L 1/0004* (2013.01); *H04L 5/0055* (2013.01); *H04W 72/20* (2023.01)

(58) Field of Classification Search
CPC . H04L 1/0004; H04L 5/0055; H04W 72/0406
See application file for complete search history.

(56) References Cited

U.S. PATENT DOCUMENTS

| | | | | |
|---|---|---|---|---|
| 2006/0203924 | A1* | 9/2006 | Casaccia | H04L 1/04 375/260 |
| 2007/0022362 | A1* | 1/2007 | Yue | H03M 13/1185 714/790 |
| 2016/0150524 | A1* | 5/2016 | Ramkumar | H04L 1/0002 370/329 |
| 2021/0022159 | A1* | 1/2021 | Feng | H04W 56/0045 |
| 2021/0067266 | A1* | 3/2021 | Ahn | H04L 1/0041 |
| 2022/0069946 | A1* | 3/2022 | Li | H04L 1/1607 |

* cited by examiner

*Primary Examiner* — Malick A Sohrab
(74) *Attorney, Agent, or Firm* — Dalei Dong; Harrity & Harrity, LLP

(57) ABSTRACT

Various aspects of the present disclosure generally relate to wireless communication. In some aspects, a transmitter device may transmit, to a receiver device, an initial message associated with a communication using a first code rate. The transmitter device may receive, from the receiver device, first feedback information indicating that the communication was not successfully decoded by the receiver device. The transmitter device may transmit, to the receiver device based at least in part on the reception of the first feedback information, one or more retransmissions associated with the communication including a first retransmission, wherein the first retransmission includes a first number of bits to lower an effective code rate of the communication to a second code rate. The transmitter device may receive, from the receiver device, second feedback information indicating that the communication was successfully decoded by the receiver device. Numerous other aspects are described.

29 Claims, 10 Drawing Sheets

TECHNIQUES FOR A MULTIPLE INCREMENTAL REDUNDANCY RETRANSMISSION SCHEME

FIELD OF THE DISCLOSURE

Aspects of the present disclosure generally relate to wireless communication and to techniques and apparatuses for a multiple incremental redundancy retransmission scheme.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and the "uplink" (or "reverse link") refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a transmitter device includes transmitting, to a receiver device, an initial message associated with a communication using a first code rate; receiving, from the receiver device, first feedback information indicating that the communication was not successfully decoded by the receiver device; transmitting, to the receiver device based at least in part on the reception of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and receiving, from the receiver device, second feedback information indicating that the communication was successfully decoded by the receiver device, wherein the effective code rate for the communication is based at least in part on a second number of bits included in the initial message and the first number of bits included in the first retransmission.

In some aspects, transmitting the one or more retransmissions associated with the communication comprises: receiving, from the receiver device after the transmission of the first retransmission, third feedback information indicating that the communication was not successfully decoded using the first retransmission; and transmitting, to the receiver device based at least in part on the reception of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, and the reception of the second feedback information indicating that the communication was successfully decoded is based at least in part on the transmission of the second retransmission, and wherein the effective code rate for the communication is based at least in part on the second number of bits included in the initial message, the first number of bits included the first retransmission, and the third number of bits included in the second retransmission.

In some aspects, receiving the first feedback information includes at least one of: receiving feedback information for a transport block associated with the communication, receiving feedback information for a code block associated with the communication, or receiving feedback information for a code block group associated with the communication.

In some aspects, receiving the first feedback information includes receiving, from the receiver device, information indicating an allowable code rate for the communication.

In some aspects, transmitting the one or more retransmissions associated with the communication includes at least one of: transmitting the first retransmission including the first number of bits for all code blocks of a transport block associated with the communication that was not successfully decoded by the receiver device, transmitting the first retransmission including the first number of bits for one or more code blocks associated with the communication that were not successfully decoded by the receiver device, or transmitting the first retransmission including the first number of bits for one or more code block groups associated with at least one code block that was not successfully decoded by the receiver device.

In some aspects, the method includes receiving, from the receiver device, a channel state information report for the channel; estimating, based at least in part on the channel state information report, an achievable throughput for the channel; and selecting the first code rate to be associated with a throughput that is greater than the estimated achievable throughput for the channel.

In some aspects, the method includes performing outer loop link adaptation to select the first code rate using a target block error rate that is associated with a value that is greater than a threshold value.

In some aspects, the method includes transmitting, to the receiver device, redundancy version information associated with retransmissions of the communication, wherein the redundancy version information indicates a size and a content of each retransmission associated with the communication.

In some aspects, the method includes transmitting, to the receiver device, redundancy version information indicating a size of the one or more retransmissions via a downlink control information message.

In some aspects, the method includes transmitting, to the receiver device, redundancy version information indicating a size of the one or more retransmissions relative to a size of the communication or a size of a previous retransmission.

In some aspects, a size of the first retransmission is based at least in part on a redundancy version step size value associated with the first retransmission, wherein the redundancy version step size value indicates the first number of bits included in the first retransmission.

In some aspects, the method includes transmitting, to the receiver device, redundancy version information indicating a redundancy version step size value associated with the one or more retransmissions that indicates a size of the one or more retransmissions via at least one of a downlink control information message, a radio resource control message, or a medium access control (MAC) control element (MAC-CE) message.

In some aspects, a size of the one or more retransmissions is based at least in part on a redundancy version step size value that is based at least in part on a network status or an application associated with the communication.

In some aspects, a size of the one or more retransmissions is based at least in part on a redundancy version step size vector, wherein the redundancy version step size vector indicates redundancy version step size values for the one or more retransmissions.

In some aspects, the redundancy version step size vector indicates a first redundancy version step size value for the first retransmission and a second redundancy version step size value for a second retransmission.

In some aspects, a size of the one or more retransmissions is determined by the receiver device using a blind detection technique.

In some aspects, the method includes determining a size of the one or more retransmissions based at least in part on a redundancy version step size value associated with the first retransmission; and transmitting, to the receiver device, an indication of the size of the one or more retransmissions.

In some aspects, the method includes transmitting, to the receiver device via downlink control information, redundancy version information indicating a content of the one or more retransmissions using a starting position of a number of bits associated with each retransmission included in the one or more retransmissions in a cyclic buffer.

In some aspects, a starting position of a number of bits associated with each retransmission included in the one or more retransmissions in a cyclic buffer is based at least in part on a size of a previous transmission and a starting position of the previous transmission.

In some aspects, a starting position of a number of bits associated with each retransmission included in the one or more retransmissions in a cyclic buffer is based at least in part on a starting position vector, the starting position vector indicates a starting position for the one or more retransmissions.

In some aspects, the method includes transmitting, to the receiver device, an indication of the starting position vector via at least one of a downlink control information message, a radio resource control message, or a MAC-CE message.

In some aspects, the first code rate is associated with a first spectral efficiency or a first modulation and coding scheme (MCS) and the second code rate is associated with a second spectral efficiency or a second MCS.

In some aspects, a method of wireless communication performed by a receiver device includes receiving, from a transmitter device, an initial message associated with a communication using a first code rate; transmitting, to the transmitter device, first feedback information indicating that the communication was not successfully decoded by the receiver device; receiving, from the transmitter device based at least in part on the transmission of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and transmitting, to the transmitter device, second feedback information indicating that the communication was successfully decoded by the receiver device, wherein the effective code rate for the communication is based at least in part on a second number of bits included in the initial message and the first number of bits included in the first retransmission.

In some aspects, receiving the one or more retransmissions includes: transmitting, to the transmitter device after the transmission of the first retransmission, third feedback information indicating that the communication was not successfully decoded using the first retransmission; and receiving, from the transmitter device based at least in part on the transmission of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, and the transmission of the second feedback information indicating that the communication was successfully decoded is based at least in part on the reception of the second retransmission, and wherein the effective code rate for the communication is based at least in part on the second number of bits included in the initial message, the first number of bits included the first retransmission, and the third number of bits included in the second retransmission.

In some aspects, transmitting the first feedback information includes at least one of: transmitting feedback information for a transport block associated with the communication, transmitting feedback information for a code block associated with the communication, or transmitting feedback information for a code block group associated with the communication.

In some aspects, transmitting the first feedback information includes transmitting, to the transmitter device, information indicating an allowable code rate for the communication.

In some aspects, receiving the one or more retransmissions associated with the communication includes at least one of: receiving the first retransmission including the first number of bits for all code blocks of a transport block associated with the communication that was not successfully decoded by the receiver device, receiving the first retransmission including the first number of bits for one or more code blocks associated with the communication that were not successfully decoded by the receiver device, or receiving the first retransmission including the first number of bits for one or more code block groups associated with at least one code block that was not successfully decoded by the receiver device.

In some aspects, the method includes receiving, from the transmitter device, redundancy version information associated with retransmissions of the communication, wherein the redundancy version information indicates a size and a content of each retransmission associated with the communication.

In some aspects, the method includes receiving, from the transmitter device, redundancy version information indicating a size of the one or more retransmissions via a downlink control information message.

In some aspects, the method includes receiving, from the transmitter device, redundancy version information indicating a size of the one or more retransmissions relative to a size of the communication or a size of a previous retransmission.

In some aspects, a size of the first retransmission is based at least in part on a redundancy version step size value associated with the first retransmission, wherein the redundancy version step size value indicates the first number of bits included in the first retransmission.

In some aspects, the method includes receiving, from the transmitter device, redundancy version information indicating a redundancy version step size value associated with the one or more retransmissions that indicates a size of the one or more retransmissions via at least one of a downlink control information message, a radio resource control message, or a MAC-CE message.

In some aspects, a size of the one or more retransmissions is based at least in part on a redundancy version step size value that is based at least in part on a network status or an application associated with the communication.

In some aspects, a size of the one or more retransmissions is based at least in part on a redundancy version step size vector, wherein the redundancy version step size vector indicates redundancy version step size values for the one or more retransmissions.

In some aspects, the redundancy version step size vector indicates a first redundancy version step size value for the first retransmission and a second redundancy version step size value for a second retransmission.

In some aspects, the method includes determining a size of the one or more retransmissions using a blind detection technique.

In some aspects, the method includes receiving, from the transmitter device via downlink control information, redundancy version information indicating a content of the one or more retransmissions using a starting position of a number of bits associated with each retransmission included in the one or more retransmissions in a cyclic buffer.

In some aspects, a starting position of a number of bits associated with each retransmission included in the one or more retransmissions in a cyclic buffer is based at least in part on a size of a previous transmission and a starting position of the previous transmission.

In some aspects, a starting position of a number of bits associated with each retransmission included in the one or more retransmissions in a cyclic buffer is based at least in part on a starting position vector, the starting position vector indicates a starting position for the one or more retransmissions.

In some aspects, the method includes receiving, from the transmitter device, an indication of the starting position vector via at least one of a downlink control information message, a radio resource control message, or a MAC-CE message.

In some aspects, the first code rate is associated with a first spectral efficiency or a first MCS and the second code rate is associated with a second spectral efficiency or a second MCS.

In some aspects, the first code rate is associated with a throughput that is greater than an estimated achievable throughput for the channel.

In some aspects, a transmitter device for wireless communication includes a memory and one or more processors, coupled to the memory, configured to: transmit, to a receiver device, an initial message associated with a communication using a first code rate; receive, from the receiver device, first feedback information indicating that the communication was not successfully decoded by the receiver device; transmit, to the receiver device based at least in part on the reception of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and receive, from the receiver device, second feedback information indicating that the communication was successfully decoded by the receiver device, wherein the effective code rate for the communication is based at least in part on a second number of bits included in the initial message and the first number of bits included in the first retransmission.

In some aspects, the one or more processors, to transmit the one or more retransmissions associated with the communication, are configured to receive, from the receiver device after the transmission of the first retransmission, third feedback information indicating that the communication was not successfully decoded using the first retransmission; and transmit, to the receiver device based at least in part on the reception of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, and the reception of the second feedback information indicating that the communication was successfully decoded is based at least in part on the transmission of the second retransmission, and wherein the effective code rate for the communication is based at least in part on the second number of bits included in the initial message, the first number of bits included the first retransmission, and the third number of bits included in the second retransmission.

In some aspects, the one or more processors, to receive the first feedback information, are configured to receive feedback information for a transport block associated with the communication, receive feedback information for a code block associated with the communication, or receive feedback information for a code block group associated with the communication.

In some aspects, the one or more processors, to receive the first feedback information, are configured to receive, from the receiver device, information indicating an allowable code rate for the communication.

In some aspects, the one or more processors, to transmit the one or more retransmissions associated with the communication, are configured to transmit the first retransmission including the first number of bits for all code blocks of a transport block associated with the communication that was not successfully decoded by the receiver device, or transmit the first retransmission including the first number of bits for one or more code blocks associated with the communication that were not successfully decoded by the receiver device.

In some aspects, the one or more processors are further configured to receive, from the receiver device, a channel state information report for the channel; estimate, based at least in part on the channel state information report, an achievable throughput for the channel; and select the first code rate to be associated with a throughput that is greater than the estimated achievable throughput for the channel.

In some aspects, the one or more processors are further configured to perform outer loop link adaptation to select the first code rate using a target block error rate that is associated with a value that is greater than a threshold value.

In some aspects, the one or more processors are further configured to transmit, to the receiver device, redundancy version information associated with retransmissions of the communication, wherein the redundancy version information indicates a size and a content of each retransmission associated with the communication.

In some aspects, the one or more processors are further configured to transmit, to the receiver device, redundancy version information indicating a size of the one or more retransmissions via a downlink control information message.

In some aspects, the one or more processors are further configured to transmit, to the receiver device, redundancy version information indicating a size of the one or more retransmissions relative to a size of the communication or a size of a previous retransmission.

In some aspects, a size of the first retransmission is based at least in part on a redundancy version step size value associated with the first retransmission, wherein the redundancy version step size value indicates the first number of bits included in the first retransmission.

In some aspects, the one or more processors are further configured to transmit, to the receiver device, redundancy version information indicating a redundancy version step size value associated with the one or more retransmissions that indicates a size of the one or more retransmissions via at least one of a downlink control information message, a radio resource control message, or a MAC-CE message.

In some aspects, a size of the one or more retransmissions is based at least in part on a redundancy version step size value that is based at least in part on a network status or an application associated with the communication.

In some aspects, a size of the one or more retransmissions is based at least in part on a redundancy version step size vector, wherein the redundancy version step size vector indicates redundancy version step size values for the one or more retransmissions.

In some aspects, the redundancy version step size vector indicates a first redundancy version step size value for the first retransmission and a second redundancy version step size value for a second retransmission.

In some aspects, a size of the one or more retransmissions is determined by the receiver device using a blind detection technique.

In some aspects, the one or more processors are further configured to determine a size of the one or more retransmissions based at least in part on a redundancy version step size value associated with the first retransmission; and transmit, to the receiver device, an indication of the size of the one or more retransmissions.

In some aspects, the one or more processors are further configured to transmit, to the receiver device via downlink control information, redundancy version information indicating a content of the one or more retransmissions using a starting position of a number of bits associated with each retransmission included in the one or more retransmissions in a cyclic buffer.

In some aspects, a starting position of a number of bits associated with each retransmission included in the one or more retransmissions in a cyclic buffer is based at least in part on a size of a previous transmission and a starting position of the previous transmission.

In some aspects, a starting position of a number of bits associated with each retransmission included in the one or more retransmissions in a cyclic buffer is based at least in part on a starting position vector, the starting position vector indicates a starting position for the one or more retransmissions.

In some aspects, the one or more processors are further configured to transmit, to the receiver device, an indication of the starting position vector via at least one of a downlink control information message, a radio resource control message, or a MAC-CE message.

In some aspects, the first code rate is associated with a first spectral efficiency or a first MCS and the second code rate is associated with a second spectral efficiency or a second MCS.

In some aspects, a receiver device for wireless communication includes a memory and one or more processors, coupled to the memory, configured to: receive, from a transmitter device, an initial message associated with a communication using a first code rate; transmit, to the transmitter device, first feedback information indicating that the communication was not successfully decoded by the receiver device; receive, from the transmitter device based at least in part on the transmission of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and transmit, to the transmitter device, second feedback information indicating that the communication was successfully decoded by the receiver device, wherein the effective code rate for the communication is based at least in part on a second number of bits included in the initial message and the first number of bits included in the first retransmission.

In some aspects, the one or more processors, to receive the one or more retransmissions, are configured to transmit, to the transmitter device after the transmission of the first retransmission, third feedback information indicating that the communication was not successfully decoded using the first retransmission; and receive, from the transmitter device based at least in part on the transmission of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, and the transmission of the second feedback information indicating that the communication was successfully decoded is based at least in part on the reception of the second retransmission, and wherein the effective code rate for the communication is based at least in part on the second number of bits included in the initial message, the first number of bits included the first retransmission, and the third number of bits included in the second retransmission.

In some aspects, the one or more processors, to transmit the first feedback information, are configured to transmit feedback information for a transport block associated with the communication, transmit feedback information for a code block associated with the communication, or transmit feedback information for a code block group associated with the communication.

In some aspects, the one or more processors, to transmit the first feedback information, are configured to transmit, to the transmitter device, information indicating an allowable code rate for the communication.

In some aspects, the one or more processors, to receive the one or more retransmissions associated with the communication, are configured to receive the first retransmission including the first number of bits for all code blocks of a transport block associated with the communication that was not successfully decoded by the receiver device, or receive the first retransmission including the first number of bits for one or more code blocks associated with the communication that were not successfully decoded by the receiver device.

In some aspects, the one or more processors are further configured to receive, from the transmitter device, redundancy version information associated with retransmissions of the communication, wherein the redundancy version information indicates a size and a content of each retransmission associated with the communication.

In some aspects, the one or more processors are further configured to receive, from the transmitter device, redundancy version information indicating a size of the one or more retransmissions via a downlink control information message.

In some aspects, the one or more processors are further configured to receive, from the transmitter device, redundancy version information indicating a size of the one or more retransmissions relative to a size of the communication or a size of a previous retransmission.

In some aspects, a size of the first retransmission is based at least in part on a redundancy version step size value associated with the first retransmission, wherein the redundancy version step size value indicates the first number of bits included in the first retransmission.

In some aspects, the one or more processors are further configured to receive, from the transmitter device, redundancy version information indicating a redundancy version step size value associated with the one or more retransmissions that indicates a size of the one or more retransmissions via at least one of a downlink control information message, a radio resource control message, or a MAC-CE message.

In some aspects, a size of the one or more retransmissions is based at least in part on a redundancy version step size value that is based at least in part on a network status or an application associated with the communication.

In some aspects, a size of the one or more retransmissions is based at least in part on a redundancy version step size vector, wherein the redundancy version step size vector indicates redundancy version step size values for the one or more retransmissions.

In some aspects, the redundancy version step size vector indicates a first redundancy version step size value for the first retransmission and a second redundancy version step size value for a second retransmission.

In some aspects, the one or more processors are further configured to determine a size of the one or more retransmissions using a blind detection technique.

In some aspects, the one or more processors are further configured to receive, from the transmitter device via downlink control information, redundancy version information indicating a content of the one or more retransmissions using a starting position of a number of bits associated with each retransmission included in the one or more retransmissions in a cyclic buffer.

In some aspects, a starting position of a number of bits associated with each retransmission included in the one or more retransmissions in a cyclic buffer is based at least in part on a size of a previous transmission and a starting position of the previous transmission.

In some aspects, a starting position of a number of bits associated with each retransmission included in the one or more retransmissions in a cyclic buffer is based at least in part on a starting position vector, the starting position vector indicates a starting position for the one or more retransmissions.

In some aspects, the one or more processors are further configured to receive, from the transmitter device, an indication of the starting position vector via at least one of a downlink control information message, a radio resource control message, or a MAC-CE message.

In some aspects, the first code rate is associated with a first spectral efficiency or a first MCS and the second code rate is associated with a second spectral efficiency or a second MCS.

In some aspects, the first code rate is associated with a throughput that is greater than an estimated achievable throughput for the channel.

In some aspects, a non-transitory computer-readable medium storing a set of instructions for wireless communication includes one or more instructions that, when executed by one or more processors of a transmitter device, cause the transmitter device to: transmit, to a receiver device, an initial message associated with a communication using a first code rate; receive, from the receiver device, first feedback information indicating that the communication was not successfully decoded by the receiver device; transmit, to the receiver device based at least in part on the reception of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and receive, from the receiver device, second feedback information indicating that the communication was successfully decoded by the receiver device, wherein the effective code rate for the communication is based at least in part on a second number of bits included in the initial message and the first number of bits included in the first retransmission.

In some aspects, the one or more instructions, that cause the transmitter device to transmit the one or more retransmissions associated with the communication, cause the transmitter device to receive, from the receiver device after the transmission of the first retransmission, third feedback information indicating that the communication was not successfully decoded using the first retransmission; and transmit, to the receiver device based at least in part on the reception of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, and the reception of the second feedback information indicating that the communication was successfully decoded is based at least in part on the transmission of the second retransmission, and wherein the effective code rate for the communication is based at least in part on the second number of bits included in the initial message, the first number of bits included the first retransmission, and the third number of bits included in the second retransmission.

In some aspects, the one or more instructions, that cause the transmitter device to receive the first feedback information, cause the transmitter device to receive feedback information for a transport block associated with the communication, receive feedback information for a code block associated with the communication, or receive feedback information for a code block group associated with the communication.

In some aspects, the one or more instructions, that cause the transmitter device to receive the first feedback information, cause the transmitter device to receive, from the receiver device, information indicating an allowable code rate for the communication.

In some aspects, the one or more instructions, that cause the transmitter device to transmit the one or more retransmissions associated with the communication, cause the transmitter device to transmit the first retransmission including the first number of bits for all code blocks of a transport block associated with the communication that was not successfully decoded by the receiver device, or transmit the first retransmission including the first number of bits for one or more code blocks associated with the communication that were not successfully decoded by the receiver device.

In some aspects, the one or more instructions further cause the transmitter device to: receive, from the receiver device, a channel state information report for the channel; estimate, based at least in part on the channel state information report, an achievable throughput for the channel; and select the first code rate to be associated with a throughput that is greater than the estimated achievable throughput for the channel.

In some aspects, the one or more instructions further cause the transmitter device to perform outer loop link adaptation to select the first code rate using a target block error rate that is associated with a value that is greater than a threshold value.

In some aspects, the one or more instructions further cause the transmitter device to transmit, to the receiver device, redundancy version information associated with retransmissions of the communication, wherein the redundancy version information indicates a size and a content of each retransmission associated with the communication.

In some aspects, the one or more instructions further cause the transmitter device to transmit, to the receiver device, redundancy version information indicating a size of the one or more retransmissions via a downlink control information message.

In some aspects, the one or more instructions further cause the transmitter device to transmit, to the receiver device, redundancy version information indicating a size of the one or more retransmissions relative to a size of the communication or a size of a previous retransmission.

In some aspects, a size of the first retransmission is based at least in part on a redundancy version step size value associated with the first retransmission, wherein the redundancy version step size value indicates the first number of bits included in the first retransmission.

In some aspects, the one or more instructions further cause the transmitter device to transmit, to the receiver device, redundancy version information indicating a redundancy version step size value associated with the one or more retransmissions that indicates a size of the one or more retransmissions via at least one of a downlink control information message, a radio resource control message, or a MAC-CE message.

In some aspects, a size of the one or more retransmissions is based at least in part on a redundancy version step size value that is based at least in part on a network status or an application associated with the communication.

In some aspects, a size of the one or more retransmissions is based at least in part on a redundancy version step size vector, wherein the redundancy version step size vector indicates redundancy version step size values for the one or more retransmissions.

In some aspects, the redundancy version step size vector indicates a first redundancy version step size value for the first retransmission and a second redundancy version step size value for a second retransmission.

In some aspects, a size of the one or more retransmissions is determined by the receiver device using a blind detection technique.

In some aspects, the one or more instructions further cause the transmitter device to determine a size of the one or more retransmissions based at least in part on a redundancy version step size value associated with the first retransmission; and transmit, to the receiver device, an indication of the size of the one or more retransmissions.

In some aspects, the one or more instructions further cause the transmitter device to transmit, to the receiver device via downlink control information, redundancy version information indicating a content of the one or more retransmissions using a starting position of a number of bits associated with each retransmission included in the one or more retransmissions in a cyclic buffer.

In some aspects, a starting position of a number of bits associated with each retransmission included in the one or more retransmissions in a cyclic buffer is based at least in part on a size of a previous transmission and a starting position of the previous transmission.

In some aspects, a starting position of a number of bits associated with each retransmission included in the one or more retransmissions in a cyclic buffer is based at least in part on a starting position vector, the starting position vector indicates a starting position for the one or more retransmissions.

In some aspects, the one or more instructions further cause the transmitter device to transmit, to the receiver device, an indication of the starting position vector via at least one of a downlink control information message, a radio resource control message, or a MAC-CE message.

In some aspects, the first code rate is associated with a first spectral efficiency or a first MCS and the second code rate is associated with a second spectral efficiency or a second MCS.

In some aspects, a non-transitory computer-readable medium storing a set of instructions for wireless communication includes one or more instructions that, when executed by one or more processors of a receiver device, cause the receiver device to receive, from a transmitter device, an initial message associated with a communication using a first code rate; transmit, to the transmitter device, first feedback information indicating that the communication was not successfully decoded by the receiver device; receive, from the transmitter device based at least in part on the transmission of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and transmit, to the transmitter device, second feedback information indicating that the communication was successfully decoded by the receiver device, wherein the effective code rate for the communication is based at least in part on a second number of bits included in the initial message and the first number of bits included in the first retransmission.

In some aspects, the one or more instructions, that cause the receiver device to receive the one or more retransmissions, cause the receiver device to transmit, to the transmitter device after the transmission of the first retransmission, third feedback information indicating that the communication was not successfully decoded using the first retransmission; and receive, from the transmitter device based at least in part on the transmission of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, and the transmission of the second feedback information indicating that the communication was successfully decoded is based at least in part on the reception of the second retransmission, and wherein the effective code rate for the communication is based at least in part on the second number of bits included in the initial message, the first number of bits included the first retransmission, and the third number of bits included in the second retransmission.

In some aspects, the one or more instructions, that cause the receiver device to transmit the first feedback information, cause the receiver device to transmit feedback information for a transport block associated with the communication, transmit feedback information for a code block associated with the communication, or transmit feedback information for a code block group associated with the communication.

In some aspects, the one or more instructions, that cause the receiver device to transmit the first feedback information, cause the receiver device to transmit, to the transmitter device, information indicating an allowable code rate for the communication.

In some aspects, the one or more instructions, that cause the receiver device to receive the one or more retransmissions associated with the communication, cause the receiver device to receive the first retransmission including the first number of bits for all code blocks of a transport block associated with the communication that was not successfully decoded by the receiver device, or receive the first retransmission including the first number of bits for one or more code blocks associated with the communication that were not successfully decoded by the receiver device.

In some aspects, the one or more instructions further cause the receiver device to receive, from the transmitter device, redundancy version information associated with retransmissions of the communication, wherein the redundancy version information indicates a size and a content of each retransmission associated with the communication.

In some aspects, the one or more instructions further cause the receiver device to receive, from the transmitter device, redundancy version information indicating a size of the one or more retransmissions via a downlink control information message.

In some aspects, the one or more instructions further cause the receiver device to receive, from the transmitter device, redundancy version information indicating a size of the one or more retransmissions relative to a size of the communication or a size of a previous retransmission.

In some aspects, a size of the first retransmission is based at least in part on a redundancy version step size value associated with the first retransmission, wherein the redundancy version step size value indicates the first number of bits included in the first retransmission.

In some aspects, the one or more instructions further cause the receiver device to receive, from the transmitter device, redundancy version information indicating a redundancy version step size value associated with the one or more retransmissions that indicates a size of the one or more retransmissions via at least one of a downlink control information message, a radio resource control message, or a MAC-CE message.

In some aspects, a size of the one or more retransmissions is based at least in part on a redundancy version step size value that is based at least in part on a network status or an application associated with the communication.

In some aspects, a size of the one or more retransmissions is based at least in part on a redundancy version step size vector, wherein the redundancy version step size vector indicates redundancy version step size values for the one or more retransmissions.

In some aspects, the redundancy version step size vector indicates a first redundancy version step size value for the first retransmission and a second redundancy version step size value for a second retransmission.

In some aspects, the one or more instructions further cause the receiver device to determine a size of the one or more retransmissions using a blind detection technique.

In some aspects, the one or more instructions further cause the receiver device to receive, from the transmitter device via downlink control information, redundancy version information indicating a content of the one or more retransmissions using a starting position of a number of bits associated with each retransmission included in the one or more retransmissions in a cyclic buffer.

In some aspects, a starting position of a number of bits associated with each retransmission included in the one or more retransmissions in a cyclic buffer is based at least in part on a size of a previous transmission and a starting position of the previous transmission.

In some aspects, a starting position of a number of bits associated with each retransmission included in the one or more retransmissions in a cyclic buffer is based at least in part on a starting position vector, the starting position vector indicates a starting position for the one or more retransmissions.

In some aspects, the one or more instructions further cause the receiver device to receive, from the transmitter device, an indication of the starting position vector via at least one of a downlink control information message, a radio resource control message, or a MAC-CE message.

In some aspects, the first code rate is associated with a first spectral efficiency or a first MCS and the second code rate is associated with a second spectral efficiency or a second MCS.

In some aspects, the first code rate is associated with a throughput that is greater than an estimated achievable throughput for the channel.

In some aspects, an apparatus for wireless communication includes means for transmitting, to a receiver device, an initial message associated with a communication using a first code rate; means for receiving, from the receiver device, first feedback information indicating that the communication was not successfully decoded by the receiver device; means for transmitting, to the receiver device based at least in part on the reception of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and means for receiving, from the receiver device, second feedback information indicating that the communication was successfully decoded by the receiver device, wherein the effective code rate for the communication is based at least in part on a second number of bits included in the initial message and the first number of bits included in the first retransmission.

In some aspects, the means for transmitting the one or more retransmissions associated with the communication includes means for receiving, from the receiver device after the transmission of the first retransmission, third feedback information indicating that the communication was not successfully decoded using the first retransmission; and means for transmitting, to the receiver device based at least in part on the reception of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, and the reception of the second feedback information indicating that the communication was successfully decoded is based at least in part on the transmission of the second retransmission, and wherein the effective code rate for the communication is based at least in part on the second number of bits included in the initial message, the first number of bits included the first retransmission, and the third number of bits included in the second retransmission.

In some aspects, the means for receiving the first feedback information includes at least one of: means for receiving feedback information for a transport block associated with the communication, means for receiving feedback information for a code block associated with the communication, or means for receiving feedback information for a code block group associated with the communication.

In some aspects, the means for receiving the first feedback information includes means for receiving, from the receiver device, information indicating an allowable code rate for the communication.

In some aspects, the means for transmitting the one or more retransmissions associated with the communication includes at least one of: means for transmitting the first retransmission including the first number of bits for all code blocks of a transport block associated with the communication that was not successfully decoded by the receiver device, means for transmitting the first retransmission including the first number of bits for one or more code blocks associated with the communication that were not successfully decoded by the receiver device, or means for transmitting the first retransmission including the first number of bits for one or more code block groups associated with at least one code block that was not successfully decoded by the receiver device.

In some aspects, the apparatus includes means for receiving, from the receiver device, a channel state information report for the channel; means for estimating, based at least in part on the channel state information report, an achievable throughput for the channel; and means for selecting the first code rate to be associated with a throughput that is greater than the estimated achievable throughput for the channel.

In some aspects, the apparatus includes means for performing outer loop link adaptation to select the first code rate using a target block error rate that is associated with a value that is greater than a threshold value.

In some aspects, the apparatus includes means for transmitting, to the receiver device, redundancy version information associated with retransmissions of the communication, wherein the redundancy version information indicates a size and a content of each retransmission associated with the communication.

In some aspects, the apparatus includes means for transmitting, to the receiver device, redundancy version information indicating a size of the one or more retransmissions via a downlink control information message.

In some aspects, the apparatus includes means for transmitting, to the receiver device, redundancy version information indicating a size of the one or more retransmissions relative to a size of the communication or a size of a previous retransmission.

In some aspects, a size of the first retransmission is based at least in part on a redundancy version step size value associated with the first retransmission, wherein the redundancy version step size value indicates the first number of bits included in the first retransmission.

In some aspects, the apparatus includes means for transmitting, to the receiver device, redundancy version information indicating a redundancy version step size value associated with the one or more retransmissions that indicates a size of the one or more retransmissions via at least one of a downlink control information message, a radio resource control message, or a MAC-CE message.

In some aspects, a size of the one or more retransmissions is based at least in part on a redundancy version step size value that is based at least in part on a network status or an application associated with the communication.

In some aspects, a size of the one or more retransmissions is based at least in part on a redundancy version step size vector, wherein the redundancy version step size vector indicates redundancy version step size values for the one or more retransmissions.

In some aspects, the redundancy version step size vector indicates a first redundancy version step size value for the first retransmission and a second redundancy version step size value for a second retransmission.

In some aspects, a size of the one or more retransmissions is determined by the receiver device using a blind detection technique.

In some aspects, the apparatus includes means for determining a size of the one or more retransmissions based at least in part on a redundancy version step size value associated with the first retransmission; and means for transmitting, to the receiver device, an indication of the size of the one or more retransmissions.

In some aspects, the apparatus includes means for transmitting, to the receiver device via downlink control information, redundancy version information indicating a content of the one or more retransmissions using a starting position of a number of bits associated with each retransmission included in the one or more retransmissions in a cyclic buffer.

In some aspects, a starting position of a number of bits associated with each retransmission included in the one or more retransmissions in a cyclic buffer is based at least in part on a size of a previous transmission and a starting position of the previous transmission.

In some aspects, a starting position of a number of bits associated with each retransmission included in the one or more retransmissions in a cyclic buffer is based at least in part on a starting position vector, the starting position vector indicates a starting position for the one or more retransmissions.

In some aspects, the apparatus includes means for transmitting, to the receiver device, an indication of the starting position vector via at least one of a downlink control information message, a radio resource control message, or a MAC-CE message.

In some aspects, the first code rate is associated with a first spectral efficiency or a first MCS and the second code rate is associated with a second spectral efficiency or a second MCS.

In some aspects, an apparatus for wireless communication includes means for receiving, from a transmitter device, an initial message associated with a communication using a first code rate; means for transmitting, to the transmitter device, first feedback information indicating that the communication was not successfully decoded by the apparatus; means for receiving, from the transmitter device based at least in part on the transmission of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and means for transmitting, to the transmitter device, second feedback information indicating that the communication was successfully decoded by the apparatus, wherein the effective code rate for the communication is based at least in part on a second number of bits included in the initial message and the first number of bits included in the first retransmission.

In some aspects, the means for receiving the one or more retransmissions includes: means for transmitting, to the transmitter device after the transmission of the first retransmission, third feedback information indicating that the communication was not successfully decoded using the first retransmission; and means for receiving, from the transmitter device based at least in part on the transmission of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, and the transmission of the second feedback information indicating that the communication was successfully decoded is based at least in part on the reception of the second retransmission, and wherein the effective code rate for the communication is based at least in part on the second number of bits included in the initial message, the first number of bits included the first retransmission, and the third number of bits included in the second retransmission.

In some aspects, the means for transmitting the first feedback information includes at least one of: means for transmitting feedback information for a transport block associated with the communication, means for transmitting feedback information for a code block associated with the communication, or means for transmitting feedback information for a code block group associated with the communication.

In some aspects, the means for transmitting the first feedback information includes means for transmitting, to the transmitter device, information indicating an allowable code rate for the communication.

In some aspects, the means for receiving the one or more retransmissions associated with the communication includes at least one of: means for receiving the first retransmission including the first number of bits for all code blocks of a transport block associated with the communication that was not successfully decoded by the apparatus, means for receiving the first retransmission including the first number of bits for one or more code blocks associated with the communication that were not successfully decoded by the apparatus, or means for receiving the first retransmission including the first number of bits for one or more code block groups associated with at least one code block that was not successfully decoded by the receiver device.

In some aspects, the apparatus includes means for receiving, from the transmitter device, redundancy version information associated with retransmissions of the communication, wherein the redundancy version information indicates a size and a content of each retransmission associated with the communication.

In some aspects, the apparatus includes means for receiving, from the transmitter device, redundancy version information indicating a size of the one or more retransmissions via a downlink control information message.

In some aspects, the apparatus includes means for receiving, from the transmitter device, redundancy version information indicating a size of the one or more retransmissions relative to a size of the communication or a size of a previous retransmission.

In some aspects, a size of the first retransmission is based at least in part on a redundancy version step size value associated with the first retransmission, wherein the redundancy version step size value indicates the first number of bits included in the first retransmission.

In some aspects, the apparatus includes means for receiving, from the transmitter device, redundancy version information indicating a redundancy version step size value associated with the one or more retransmissions that indicates a size of the one or more retransmissions via at least one of a downlink control information message, a radio resource control message, or a MAC-CE message.

In some aspects, a size of the one or more retransmissions is based at least in part on a redundancy version step size value that is based at least in part on a network status or an application associated with the communication.

In some aspects, a size of the one or more retransmissions is based at least in part on a redundancy version step size vector, wherein the redundancy version step size vector indicates redundancy version step size values for the one or more retransmissions.

In some aspects, the redundancy version step size vector indicates a first redundancy version step size value for the first retransmission and a second redundancy version step size value for a second retransmission.

In some aspects, the apparatus includes means for determining a size of the one or more retransmissions using a blind detection technique.

In some aspects, the apparatus includes means for receiving, from the transmitter device via downlink control information, redundancy version information indicating a content of the one or more retransmissions using a starting position of a number of bits associated with each retransmission included in the one or more retransmissions in a cyclic buffer.

In some aspects, a starting position of a number of bits associated with each retransmission included in the one or more retransmissions in a cyclic buffer is based at least in part on a size of a previous transmission and a starting position of the previous transmission.

In some aspects, a starting position of a number of bits associated with each retransmission included in the one or more retransmissions in a cyclic buffer is based at least in part on a starting position vector, the starting position vector indicates a starting position for the one or more retransmissions.

In some aspects, the apparatus includes means for receiving, from the transmitter device, an indication of the starting position vector via at least one of a downlink control information message, a radio resource control message, or a MAC-CE message.

In some aspects, the first code rate is associated with a first spectral efficiency or a first MCS and the second code rate is associated with a second spectral efficiency or a second MCS.

In some aspects, the first code rate is associated with a throughput that is greater than an estimated achievable throughput for the channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
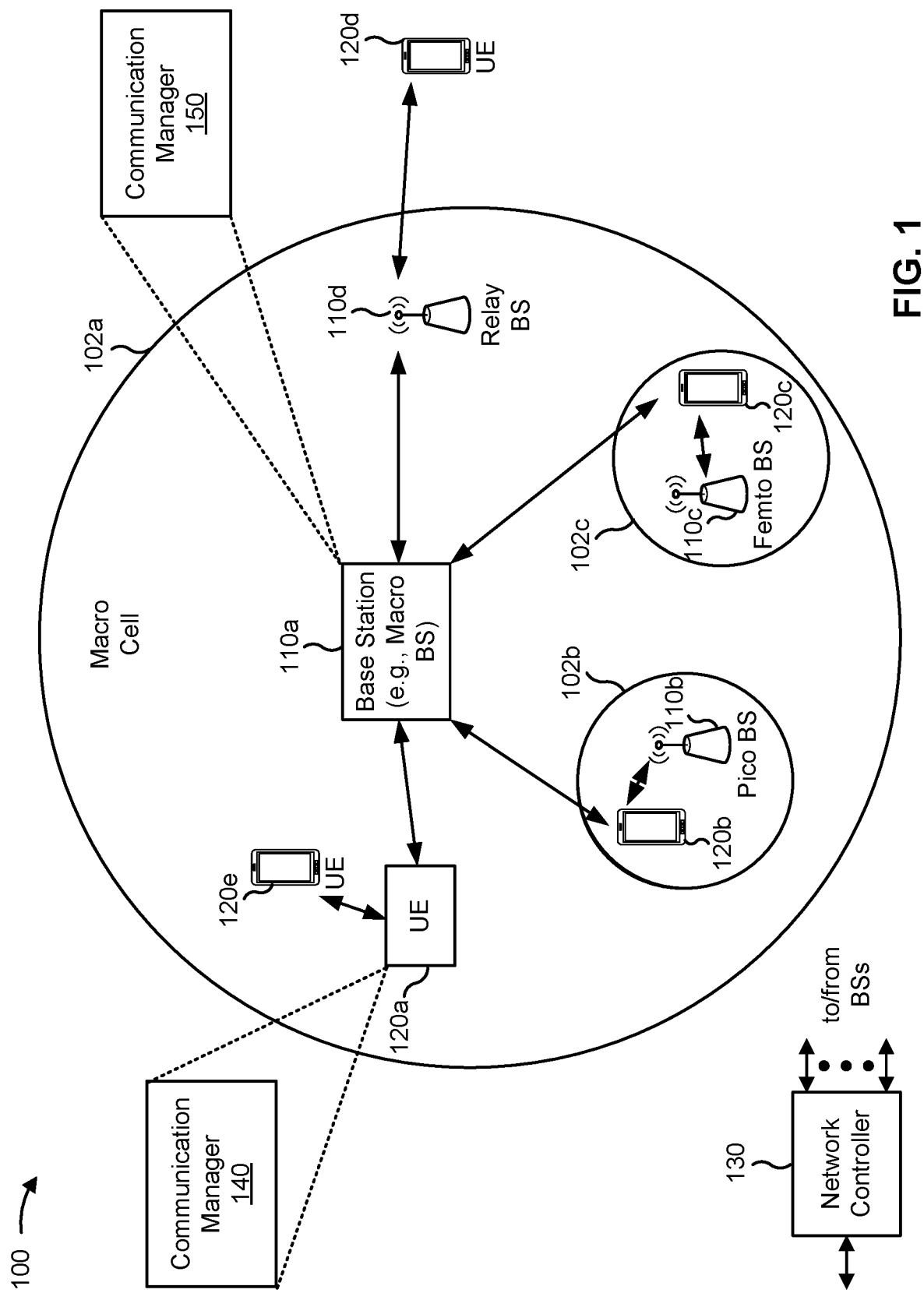
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from a transmitter device (e.g., a base station 110), an initial message associated with a communication using a first code rate; transmit, to the transmitter device, first feedback information indicating that the communication was not successfully decoded by the UE 120; receive, from the transmitter device based at least in part on the transmission of the first feedback information, one or more retransmissions associated with the communication including a first retransmission, where the first retransmission includes a first number of bits from a set of bits associated with the communication, where the first number of bits lowers an effective code rate of the communication to a second code rate; and transmit, to the transmitter device, second feedback information indicating that the communication was successfully decoded by the receiver device, where the effective code rate for the communication is based at least in part on a second number of bits included in the initial message and the first number of bits included in the first retransmission. Additionally, or alternatively, the communication manager 140 may perform one or more other operations described herein.

In some aspects, the base station 110 may include a communication manager 150. As described in more detail elsewhere herein, the communication manager 150 may transmit, to a receiver device (e.g., a UE 120), an initial message associated with a communication using a first code rate; receive, from the receiver device, first feedback information indicating that the communication was not successfully decoded by the receiver device; transmit, to the receiver device based at least in part on the reception of the first feedback information, one or more retransmissions associated with the communication including a first retransmission, where the first retransmission includes a first number of bits from a set of bits associated with the communication, and where the first number of bits lowers an effective code rate of the communication to a second code rate; and receive, from the receiver device, second feedback information indicating that the communication was successfully decoded by the receiver device, where the effective code rate for the communication is based at least in part on a second number of bits included in the initial message and the first number of bits included in the first retransmission. Additionally, or alternatively, the communication manager 150 may perform one or more other operations described herein.

As indicated above, FIG. 1 is provided as an example. Other examples may differ from what is described with regard to FIG. 1.

Figure 2:
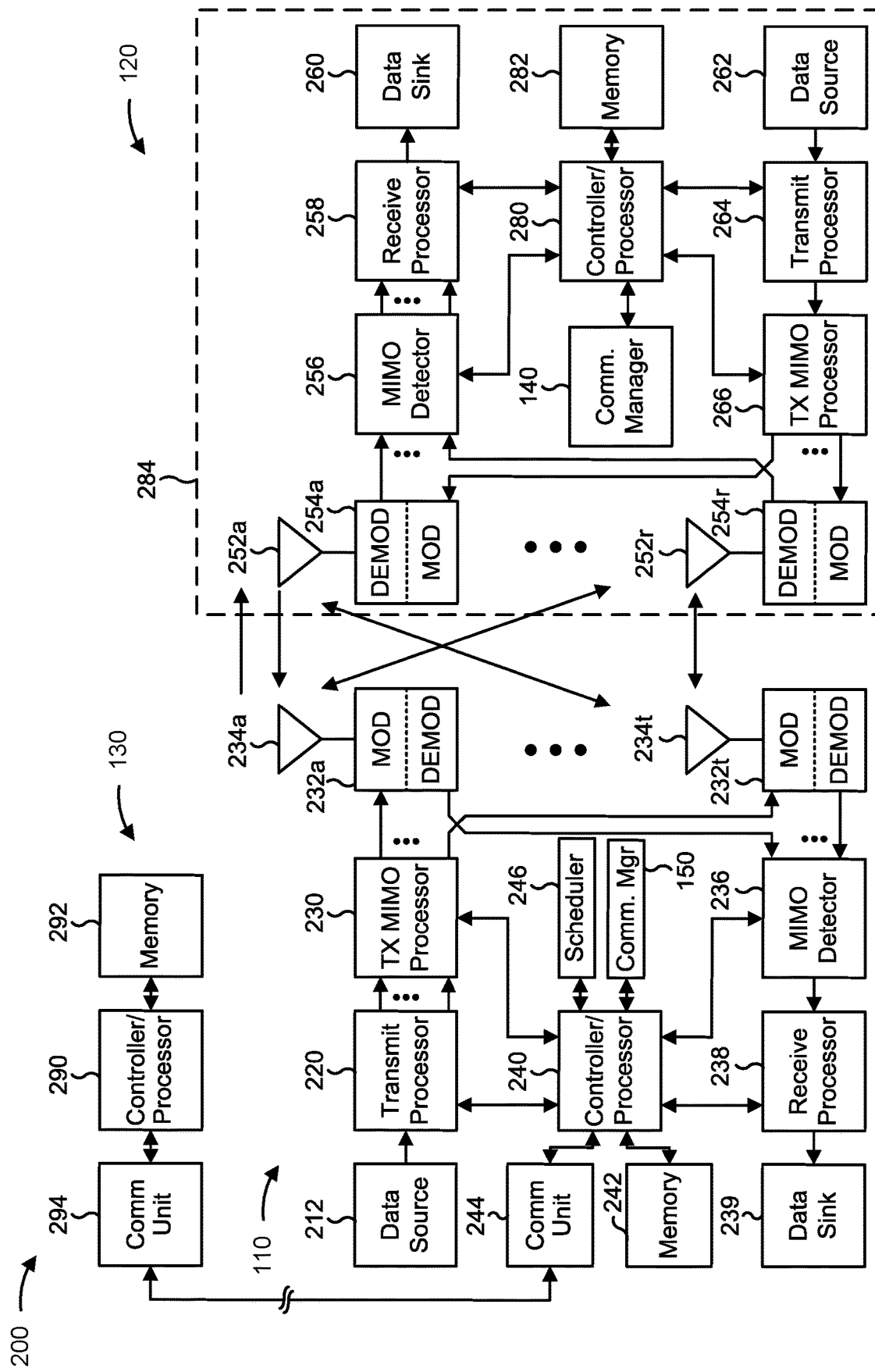
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with a multiple incremental redundancy retransmission scheme, as described in more detail elsewhere herein. In some aspects, the transmitter device described herein is the base station 110, is included in the base station 110, or includes one or more components of the base station 110 shown in FIG. 2. In some other aspects, the transmitter device described herein is the UE 120, is included in the UE 120, or includes one or more components of the UE 120 shown in FIG. 2. In some aspects, the receiver device described herein is the base station 110, is included in the base station 110, or includes one or more components of the base station 110 shown in FIG. 2. In some other aspects, the receiver device described herein is the UE 120, is included in the UE 120, or includes one or more components of the UE 120 shown in FIG. 2.

Figure 7:
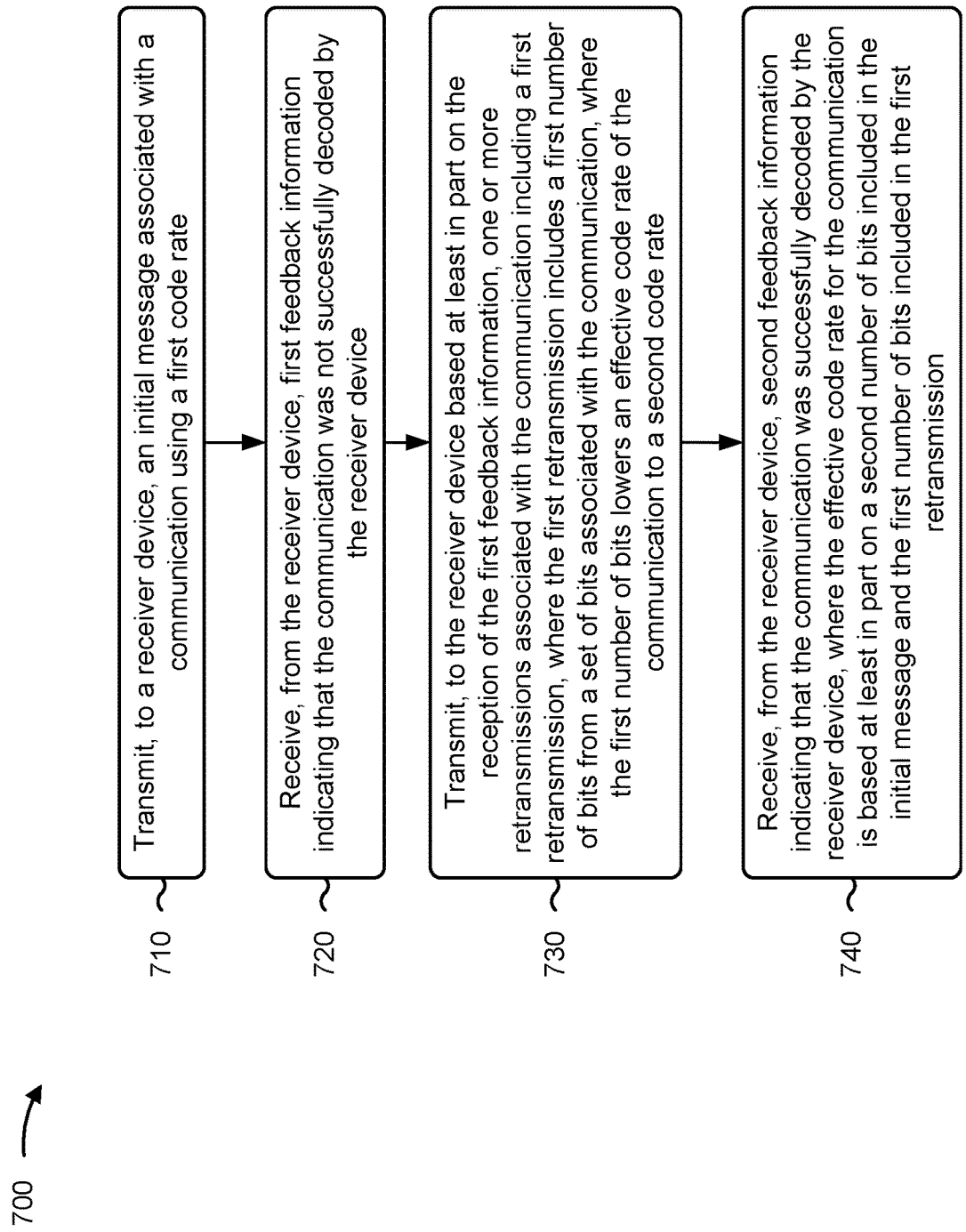
FIGS. 7 and 8 are diagrams illustrating example processes associated with a multiple incremental redundancy retransmission scheme, in accordance with the present disclosure.
Figure 8:
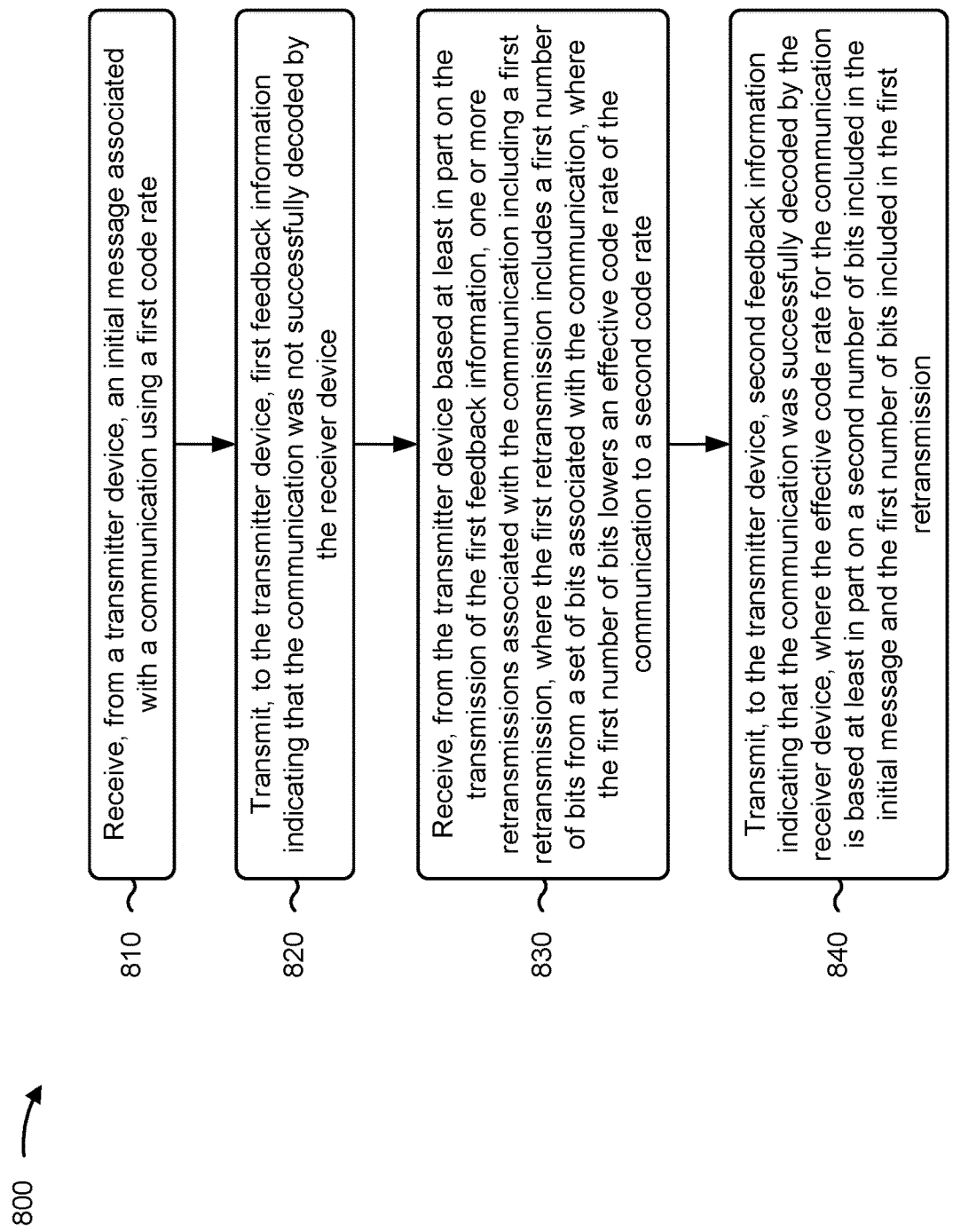

For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions.

In some aspects, the transmitter device includes means for transmitting, to a receiver device, an initial message associated with a communication using a first code rate; means for receiving, from the receiver device, first feedback information indicating that the communication was not successfully decoded by the receiver device; means for transmitting, to the receiver device based at least in part on the reception of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and/or means for receiving, from the receiver device, second feedback information indicating that the communication was successfully decoded by the receiver device, wherein the effective code rate for the communication is based at least in part on a second number of bits included in the initial message and the first number of bits included in the first retransmission. In some aspects, the means for the transmitter device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some other aspects, the means for the transmitter device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the receiver device includes means for receiving, from a transmitter device, an initial message associated with a communication using a first code rate; means for transmitting, to the transmitter device, first feedback information indicating that the communication was not successfully decoded by the receiver device; means for receiving, from the transmitter device based at least in part on the transmission of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and/or means for transmitting, to the transmitter device, second feedback information indicating that the communication was successfully decoded by the receiver device, wherein the effective code rate for the communication is based at least in part on a second number of bits included in the initial message and the first number of bits included in the first retransmission. In some aspects, the means for the receiver device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some other aspects, the means for the receiver device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
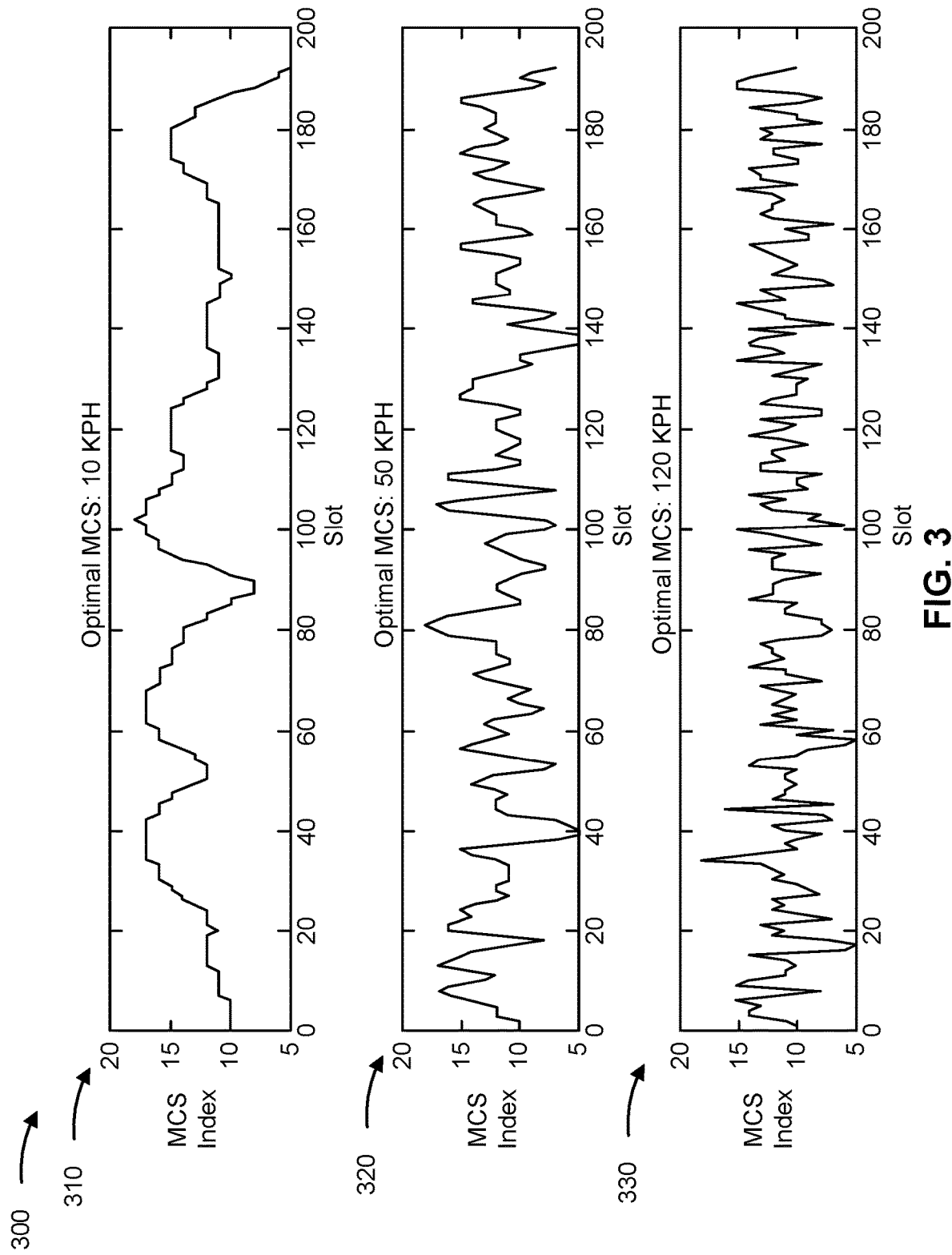
FIG. 3 is a diagram illustrating an example associated with optimal modulation and coding schemes (MCSs) for a channel over time, in accordance with the present disclosure.

FIG. 3 is a diagram illustrating an example 300 associated with per slot optimal modulation and coding schemes (MCSs) for a channel over time, in accordance with the present disclosure. FIG. 3 depicts graphs 310, 320, and 330 displaying an optimal (e.g., ideal) MCS for a channel over time. "Optimal MCS" may refer to an MCS for the channel that results in a highest throughput (or spectral efficiency) for the channel without any decoding errors or failures by a receiver device (e.g., a UE 120 or another wireless communication device). For example, an optimal MCS for a channel may enable a channel capacity (e.g., a throughput for the channel) to be fully used by a communication (e.g., a communication using an optimal MCS may be enabled to be transmitted using a highest or maximum achievable throughput for the channel). As used herein, an "achievable" parameter (such as throughput, code rate, and/or spectral efficiency) may refer to a highest (and/or best or maximum) value of the parameter that can be supported by the channel based on current channel conditions, such as interference and/or noise, among other examples. For example, "achievable throughput" may refer to a maximum amount of data that can be transmitted by a transmitter device within a unit time under the current channel conditions experienced by the transmitter device (and/or a receiver device receiving the data).

The vertical axes (or y-axes) of graphs 310, 320, and 330 show different optimal MCSs for the channel. As shown in FIG. 3, the vertical axis indicates different indices associated with the different MCSs. For example, a wireless communication standard (such as the 3GPP) may define, or otherwise fix, different MCSs. The MCSs may be identified using an index. A larger MCS index may be associated with a higher code rate and/or a higher spectral efficiency (e.g., an MCS index 28 may be associated with a higher target code rate and/or a higher spectral efficiency than an MCS index 27). An MCS may be associated with a modulation order, a target code rate, and/or a spectral efficiency, among other examples. The horizontal axes (or x-axes) of graphs 310, 320, and 330 show different slots over time, defined by a slot index associated with the different slots. "Code rate" may refer to a ratio between a transport block size and a total number of physical layer bits per slot that are available for transmission of that transport block. In other words, a code rate for a transport block may be approximately a number of bits for the transport block (including information bits and redundancy bits) divided by the number of physical channel bits available for the shared channel used to transmit the transport block. For example, a lower code rate for a communication may mean that more redundancy bits (or parity bits) are transmitted for the communication, and a higher code rate may mean that less redundancy bits (or parity bits) are transmitted for the communication.

Therefore, graphs 310, 320, and 330 depict various optimal MCSs for a channel over time. For example, a higher MCS for the channel indicates that the channel can support a higher code rate and/or a higher spectral efficiency (and therefore results in a higher throughput for the channel). However, at some points, due to channel conditions of the channel, the channel may only support a lower MCS with a lower code rate and/or a lower spectral efficiency (and therefore results in a lower throughput for the channel).

The graph 310 depicts an example for optimal MCS for a channel over time where a receiver device (e.g., a UE 120 or another wireless communication device) is traveling at 10 kilometers per hour (KPH). As shown in the graph 310, the optimal MCS for the channel (e.g., the MCS resulting in the highest possible throughput or spectral efficiency for the channel) may vary or change over time. For example, as the receiver device moves, channel conditions of the channel may change. Therefore, as channel conditions of the channel change, the optimal MCS for the channel may also change.

The graph 320 depicts an example of optimal MCS for a channel over time where a receiver device is traveling at 50 KPH. As shown in the graph 320, the optimal MCS for the channel (e.g., the MCS resulting in the highest possible throughput or spectral efficiency for the channel) may vary or change over time. As shown in FIG. 3, the receiver device traveling at 50 KPH may experience a higher degree of variance of channel conditions experienced by the receiver device than the receiver device traveling at 10 KPH. Therefore, the optimal MCS for the channel may vary more frequently and/or may have a larger variance for the receiver device traveling at 50 KPH compared to the receiver device traveling at 10 KPH.

The graph 330 depicts an optimal MCS for a channel over time where a receiver device is traveling at 120 KPH. As shown in FIG. 3, the receiver device traveling at 120 KPH may experience a higher degree of variance of channel conditions experienced by the receiver device than the receiver devices traveling at 10 KPH or 50 KPH. Therefore, the optimal MCS for the channel may vary more frequently and/or may have a larger variance for the receiver device traveling at 120 KPH compared to the receiver devices traveling at 10 KPH or 50 KPH. For example, for two consecutive slots, an optimal MCS index for the receiver device traveling at 120 KPH may vary up to five indices or more (e.g., an optimal MCS for a first slot may be MCS 25 and the optimal MCS for the next slot may be MCS 20).

Therefore, as a velocity of a receiver device increases, the variability of the optimal MCS for the channel may also increase.

A transmitter device (e.g., a base station 110, a UE 120, or another wireless communication device) may track a channel capacity over time. For example, the transmitter device may use a channel state information (CSI) reference signal (CSI-RS) based channel capacity tracking scheme to determine or track an optimal code rate or an optimal MCS for the channel. For example, the transmitter device may receive CSI reports from a receiver device indicating measurements of CSI-RSs transmitted by the transmitter device. The transmitter device may use the measurements of the CSI-RSs to perform MCS adaptation and/or other traffic adaptation (e.g., code rate adaptation) based on the measurements of the CSI-RSs (e.g., based on the CSI report). For example, in some cases, the transmitter device may select an MCS, based on the CSI report, that will result in a highest throughput for the channel for an upcoming CSI interval ("CSI interval" may refer to a time between reception of CSI reports). As another example, the transmitter device may select an MCS, based on the CSI report, that will satisfy, or result in, a target block error rate (BLER) for the channel, such as a BLER of 5 percent, 10 percent, or 20 percent, among other examples. However, a transmitter in real world scenarios may not support or may not be capable of selecting an MCS that will result in a highest throughput for the channel for an upcoming CSI interval or that will satisfy, or result in, a target block error rate (BLER) for the channel, such as a BLER of 5 percent, 10 percent, or 20 percent, among other examples. For example, in real world conditions, the transmitter device may select an MCS, based on the CSI report, that will result in a highest throughput for the channel assuming the channel conditions are fixed for the upcoming CSI interval.

However, CSI-RSs and/or corresponding CSI reports may be transmitted periodically at discrete times. For example, the transmitter device may receive a CSI report during a slot, which may be referred to herein as a "CSI-RS slot." CSI-RS slots may occur periodically (e.g., according to a CSI interval), such as once every 40 slots. As shown in FIG. 3, the optimal MCS for the channel may have large variations over 40 slots, even when the velocity of the receiver device is low (such as 10 KPH). Therefore, an MCS or code rate selected at one CSI-RS slot may not be accurate or ideal for the channel over the CSI interval (e.g., over the 40 slots until CSI-RS based adaptation is performed again the by transmitter device).

In some cases, the transmitter device may perform outer loop link adaptation (OLLA) to adjust or adapt a selected MCS between CSI-RS slots. For example, the transmitter device may select an appropriate MCS for a communication based at least in part on a channel quality indicator (CQI) (e.g., for downlink communications) or an estimated signal-to-interference-plus-noise ratio (SINR) (e.g., for uplink communications) and a target BLER. Further, the transmitter device may apply a correction factor for selecting the MCS based at least in part on tracking previous decoding results (e.g., previous acknowledgments (ACKs) or negative acknowledgments (NACKs) in the uplink and the downlink), based at least in part on calculating observed long-term BLER based on previous ACKs/NACKs, and based on adjusting the correction factor to achieve the target BLER. However, OLLA performed by the transmitter device may use a low target BLER (such as 5 percent, 10 percent, or 20 percent) in an attempt to mitigate the need for retransmissions. As a result, the transmitter device may not be enabled to adapt an MCS and/or code rate using OLLA to the optimal MCS as the low target BLER is used by the OLLA. Moreover, delays between data transmission, feedback transmissions (ACK/NACK feedback), and adapting the MCS or code rate for a next transmission results in the OLLA technique being unable to accurately track varying channel conditions in mobility environments (e.g., where the receiver device is moving, resulting in varying channel conditions, as described above). Therefore, even when OLLA is used by a transmitter device, a selected MCS for the channel may not approach the optimal MCS for the channel. For example, even with optimal CSI estimation (assuming the transmitter device has full knowledge of decoding results at each MCS and full knowledge of the CSI estimation, which is not realizable in actual, real-world deployments) and OLLA, the selected MCS for the channel may not be the optimal MCS. As a result, a throughput experienced by the transmitter device and the receiver device may be less than an achievable throughout for the channel (e.g., if the optimal MCS were to be used).

In some cases, the MCS for a communication is selected (and set) for a first transmission of the communication. The MCS selected for the communication may be used for the first transmission and any subsequent retransmissions of the communication. If a first transmission fails (e.g., if a receiver device is unable to successfully decode the first transmission), then the transmitter device may transmit a retransmission of the communication. In some cases, the retransmission may include approximately the same number of coded bits as the first, original transmission. For example, a redundancy version scheme may be used to select the coded bits for the retransmission. For example, retransmissions may often (e.g., in practice) include approximately the same number of coded bits as the first, original transmission.

"Redundancy version" (RV) of a retransmission refers to a set of coded bits that are transmitted for that retransmission. Using RV cycling, the transmitter device may transmit a different set of encoded bits in different retransmissions. For example, the transmitter device may store bits for a transmission in a circular buffer (e.g., stored in memory of the transmitter device). The circular buffer stores information bits and parity bits (sometimes called parity-check bits or redundancy bits). The information bits may include the data to be transmitted, and the parity bits may include linear combinations of the data (e.g., of the information bits). The transmitter device may encode information bits, parity bits, or a combination of information bits and parity bits into a set of coded bits, and may transmit the set of coded bits. The particular bits that are selected to be included in the set of coded bits for a retransmission depend on (or are defined by) the RV of that retransmission.

The set of coded bits that are transmitted for that retransmission may be the same coded bits as the coded bits included in the first (original) transmission (e.g., for a Chase combining technique). Alternatively, the set of coded bits that are transmitted for that retransmission may be different coded bits than the coded bits included in the first (original) transmission (e.g., for a Chase combining technique). As the number of coded bits included in the retransmission may be approximately the same as the number of coded bits included in the first (original) transmission, the transmission of the retransmission may result in the effective code rate for the communication being reduced by half (e.g., due to the additional coded bits transmitted for the communication in the retransmission). As a result, retransmissions result in a significant degradation of the effective code rate for a communication. The degradation of the effective code rate for a communication reduces a spectral efficiency for the communication and reduces communication performance.

Therefore, a transmitter device may select an MCS (and/or a code rate or spectral efficiency) for a communication in an attempt to mitigate a need for retransmissions. In other words, the transmitter device may select a conservative MCS (and/or a code rate or spectral efficiency) for a first transmission of a communication in an attempt to mitigate a need for retransmissions of the communication. Selecting a conservative MCS (and/or a code rate or spectral efficiency) may result in a loss of throughput for a communication as the channel may be capable of supporting a larger payload size using the same channel resource. Moreover, as described above, CSI-RS based and/or OLLA based adaptation techniques for selecting or adjusting an MCS (and/or a code rate or spectral efficiency) may be inefficient and/or inaccurate. Therefore, in some cases, the transmitter device may select on overestimated MCS (and/or a code rate or spectral efficiency) for a communication which may result in decoding errors and/or throughput loss. Therefore, in some cases, techniques for selecting and/or adapting an MCS (and/or a code rate or spectral efficiency) for a communication may result in an underestimated or conservative MCS (and/or a code rate or spectral efficiency), thereby underutilizing an available or achievable throughput for the channel Additionally, the same techniques for selecting and/or adapting an MCS (and/or a code rate or spectral efficiency) for a communication may result in an overestimated MCS (and/or a code rate or spectral efficiency), thereby resulting in decoding errors and/or throughput loss.

Some techniques and apparatuses described herein enable a retransmission scheme for communications that results in an effective code rate for the communication that approaches a capacity code rate for a channel. For example, a transmitter device may select an overestimated code rate (an overestimated MCS or spectral efficiency) for an initial transmission (e.g., an initial message) of a communication to ensure that throughput is not lost due to an underestimated code rate. For example, the transmitter device may select a highest available or configured code rate (or MCS) for the communication. A receiver device may attempt to decode the initial transmission and may send feedback information (e.g., NACK feedback and/or other information associated with the decoding procedure). As the selected code rate for the initial communication may be overestimated, the receiver device may be unable to successfully decode the entire initial transmission (e.g., the feedback may be NACK feedback). The transmitter device may transmit one or more retransmissions of the communication, where a retransmission includes only enough bits (e.g., redundancy bits or parity bits) to lower an effective code rate for the communication to a next lower code rate (or a next lower MCS). In other words, each retransmission may include a small number of coded bits (e.g., compared to the number of coded bits included in the original transmission) to incrementally lower the effective code rate for the communication.

In other words, each time the transmitter device receives NACK feedback from the receiver device, the transmitter device may schedule and transmit a small number of additional redundancy bits to incrementally lower the effective code rate for the communication. The transmitter device may continue to transmit the small sized retransmissions until the receiver device indicates that the entire communication is successfully decoded (e.g., until receiving ACK feedback from the receiver device). Moreover, a high target BLER may be used for OLLA (such as 95 percent, 90 percent, and/or 80 percent, among other examples) to ensure that the selected code rate (or MCS) for initial transmissions remains overestimated as channel conditions change over time. Therefore, for a communication, the transmitter device may be enabled to dynamically adapt the code rate of a communication (based at least in part on the ACK or NACK feedback from the receiver device) to approach an optimal or achievable code rate for the channel (e.g., based on current channel conditions experienced by the receiver device).

As a result, using the retransmission scheme described herein enables a transmitter device to achieve an improved throughput for communications. For example, by transmitting multiple, small sized, retransmissions, the code rate (and/or spectral efficiency) of a communication may be incrementally reduced to the achievable (or optimal) the code rate (and/or spectral efficiency) of a channel Therefore, the communication may experience improved throughput and/or channel utilization. As a result, communication performance may be improved using the retransmission scheme described herein by improving the adaptation and/or selection of the code rate (and/or spectral efficiency) for a communication. For example, communication performance (e.g., throughput and/or spectral efficiency) for a communication using the retransmission scheme described herein may approach or align with an optimal MCS (or code rate) for the channel, regardless of a velocity or movement of the receiver device.

Figure 4:
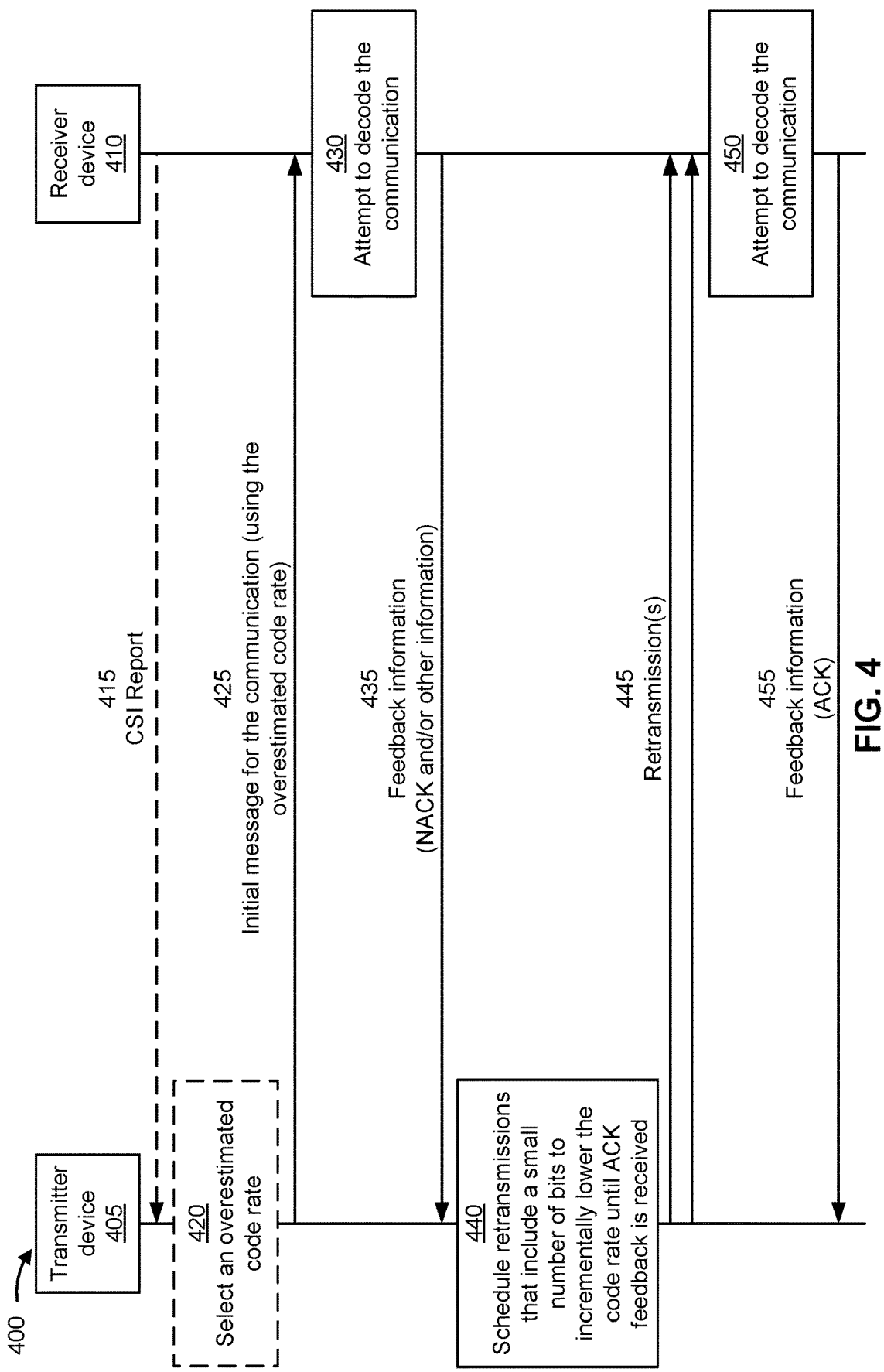
FIGS. 4-6 are diagrams illustrating examples associated with a multiple incremental redundancy retransmission scheme, in accordance with the present disclosure.

FIG. 4 is a diagram illustrating an example 400 associated with a multiple incremental redundancy retransmission scheme, in accordance with the present disclosure. As shown in FIG. 4, a transmitter device 405 and a receiver device 410 may communicate with one another in a wireless network, such as the wireless network 100. The transmitter device 405 may be a base station 110, a UE 120, or another wireless communication device. Similarly, the receiver device may be a UE 120, a base station 110, or another wireless communication device. "Transmitter device" refers to a device that is transmitting a communication, in the context of example 400 and/or other examples described herein (e.g., and does not refer to a device that is only capable of transmitting and not receiving). Similarly, "receiver device" refers to a device that is receiving the communication, in the context of example 400 and/or other examples described herein (e.g., and does not refer to a device that is only capable of receiving and not transmitting). For example, in some aspects, the transmitter device 405 may receive one or more communications and the receiver device 410 may transmit one or more communications.

As shown by reference number 415, the receiver device 410 may transmit, and the transmitter device 405 may receive, a CSI report indicating one or more CSI measurements. For example, the transmitter device 405 may transmit one or more reference signals (such as CSI-RSs) to the receiver device 410. The receiver device 410 may measure the reference signals. The receiver device 410 may transmit the CSI report indicating the measurements of the reference signal(s). For example, the receiver device 410 may measure the reference signal(s) and transmit the CSI report in accordance with a CSI measurement and/or reporting configuration. For example, the receiver device 410 may be configured to periodically transmit a CSI report (e.g., in a CSI-RS slot, such as every 40 slots). In some other aspects, the receiver device 410 may transmit the CSI report in accordance with a semi-persistent schedule and/or may transmit the CSI report dynamically (based at least in part on a request from the transmitter device 405).

The CSI report may indicate a CQI for the channel that is based at least in part on the measurement of the reference signal(s) by the receiver device 410. In some aspects, the CSI report may indicate one or more other channel parameters, such as a precoding matrix indicator (PMI), a rank indicator (RI) value, a signal to interference plus noise ratio (SINR) value, and/or a reference signal received power (RSRP) value, among other examples. Therefore, as used herein, "CSI for a channel" may refer to a CQI, a PMI, an RI, an SINR value, a signal-to-noise ratio (SNR) value, and/or an RSRP value, among other examples.

As shown by reference number 420, the transmitter device may select an overestimated code rate for a communication (for an initial transmission or an initial message of the communication). "Overestimated code rate" may refer to a code rate that is greater than an acceptable or determined code rate that is based at least in part on the CSI for the channel. For example, an overestimated code rate may be a code rate that is associated with a throughput or spectral efficiency (or that results in a throughput or spectral efficiency) that is greater than an estimated achievable throughput (or estimated achievable spectral efficiency) for the channel. For example, the transmitter device 405 may estimate (based at least in part on the CSI) an achievable throughput or an achievable spectral efficiency for the channel. The transmitted device may select a code rate that is associated with a throughput (or a spectral efficiency) that is greater than the estimated achievable throughput (or estimated achievable spectral efficiency) for the channel. In some aspects, the transmitter device 405 may select a highest possible or supported code rate.

In some aspects, selecting the code rate for the communication may include selecting an MCS for the communication. For example, in some aspects, the transmitter device may select an MCS for the communication. As described above, an MCS may be associated with a code rate and a spectral efficiency. For example, a wireless communication standard, such as the 3GPP, may define, or otherwise fix, a code rate and a spectral efficiency (and/or a modulation order) for an MCS. The transmitter device 405 may select an overestimated MCS for the communication (e.g., an MCS that is higher (associated with a higher index value) than an MCS that is acceptable or supported based at least in part on the CSI for the channel).

In some aspects, the transmitter device 405 may perform OLLA after receiving the CSI report (and before receiving a next CSI report from the receiver device 410). For example, the transmitter device 405 may select the code rate (and/or an MCS) for the communication based at least in part on a CQI (e.g., for downlink communications) or an estimated SINR (e.g., for uplink communications) and a target BLER. Further, the transmitter device 405 may apply a correction factor for selecting the code rate and/or MCS based at least in part on tracking previous decoding results, based at least in part on calculating observed long-term BLER based on previous ACKs or NACKs, and based on adjusting the correction factor to achieve the target BLER. In some aspects, the transmitter device 405 may perform the OLLA using a target BLER that is associated with a value that is greater than a threshold value (e.g., may use a high target BLER). For example, as described above, in some cases an OLLA procedure may use a low target BLER (e.g., 5 percent, 10 percent, and/or 20 percent) to mitigate the need for retransmissions. However, the transmitter device 405 may perform the OLLA using a high target BLER (such as 95 percent, 90 percent, 80 percent, and/or 75 percent, among other examples) to ensure that the selected code rate (and/or the selected MCS) for initial transmissions of communications remains overestimated, even as channel conditions improve. For example, the threshold value may be 75 percent, 80 percent, or 90 percent, among other examples.

In other words, the transmitter device 405 may select a code rate, spectral efficiency, and/or MCS for an initial transmission of a communication that is expected to result in a decoding error or failure at the receiver device 410 (e.g., in most cases). For example, the transmitter device 405 may select a code rate, spectral efficiency, and/or MCS for an initial transmission of a communication that is expected to result in a retransmission of the communication (as described in more detail below). Selecting an overestimated code rate, overestimated spectral efficiency, and/or overestimated MCS for the initial transmission of the communication may ensure that throughput is not lost (or underutilized) for the communication that would have otherwise occurred if an underestimated code rate, underestimated spectral efficiency, and/or underestimated MCS were used for the initial transmission of the communication, as described above.

In some aspects, the transmitter device 405 may select a highest available or configured code rate, MCS, and/or spectral efficiency for the initial transmission of the communication. For example, the transmitter device 405 may not select the code rate, MCS, and/or spectral efficiency for the initial transmission of the communication using CSI. Rather, the transmitter device 405 may select the highest available or configured code rate, MCS, and/or spectral efficiency for the initial transmission of the communication. The "highest available or configured code rate, MCS, and/or spectral efficiency" may refer to a code rate, MCS, and/or spectral efficiency that the transmitter device 405 and/or the receiver device 410 is capable of using for communications. In some aspects, the highest available or configured code rate, MCS, and/or spectral efficiency may refer to a highest code rate, MCS, and/or spectral efficiency defined, or otherwise fixed, by a wireless communication standard, such as the 3GPP.

In some aspects, the transmitter device 405 may select a code rate, MCS, and/or spectral efficiency for the initial transmission of the communication that is not overestimated. Instead, the transmitter device 405 may select a code rate, MCS, and/or spectral efficiency for the initial transmission of the communication that is expected to be acceptable (e.g., that is not expected to result in decoding errors or failures at the receiver device 410). If the initial transmission of the communication fails (e.g., due to a change in channel conditions), then the transmitter device 405 may proceed with transmitting one or more incremental redundancy retransmissions, as explained in more detail below.

As shown by reference number 425, the transmitter device 405 may transmit, and the receiver device 410 may receive, the initial message (e.g., the initial transmission) of the communication. In some aspects, the initial message may use the overestimated code rate (and/or the overestimated MCS or overestimated spectral efficiency) For example, the selected overestimated code rate (and/or the overestimated MCS or overestimated spectral efficiency) may be used to determine coding parameters for the communication such as rate and/or transport block size, among other examples. For example, the coding parameters for the communication may be used for the initial transmission and/or any subsequent retransmissions, as described in more detail below.

For example, the transmitter device 405 may generate a set of coded bits for the communication (e.g., including information bits and parity/redundancy bits). The initial transmission may include the information bits (e.g., the payload or the data to be transmitted in a transport block) and one or more parity or redundancy bits. The transmitter device 405 may store the generated coded bits in a buffer (e.g., in a cyclic buffer or a circular buffer). In some aspects, the number of bits (e.g., the number of parity or redundancy bits) may be based at least in part on the overestimated code rate (and/or the overestimated MCS or overestimated spectral efficiency). For example, the total number of bits (e.g., including information bits and parity or redundancy bits) in the initial transmission of the communication may result in the overestimated code rate (and/or the overestimated MCS or overestimated spectral efficiency) for the communication. For example, the initial transmission of the communication may use the overestimated code rate, the overestimated MCS, and/or the overestimated spectral efficiency based at least in part on the total number of bits (e.g., including information bits and parity or redundancy bits) included in the initial transmission of the communication.

As shown by reference number 430, the receiver device 410 may attempt to decode the initial transmission of the communication (e.g., that uses the overestimated code rate, the overestimated MCS, and/or the overestimated spectral efficiency). In some aspects, the receiver device 410 may experience one or more decoding errors or decoding failures when attempting to decode the initial transmission of the communication. For example, because the initial transmission of the communication uses the overestimated code rate, the overestimated MCS, and/or the overestimated spectral efficiency, the receiver device 410 may not be capable of completely decoding the entire communication (e.g., the entire transport block).

In some aspects, the receiver device 410 may successfully decode a portion or segment of the transport block transmitted in the initial transmission of the communication. For example, a transport block may be segmented into code blocks. A code block may include a set of information bits and a set of redundancy bits. In some aspects, one or more code blocks may be grouped into a code block group. In some aspects, the receiver device 410 may successfully decode one or more code blocks and/or one or more code block groups, but may not successfully decode the entire transport block (e.g., may not successfully decode one or more other code blocks of the transport block). For example, the receiver device 410 may attempt to decode each code block and/or each code block group of the transport block (e.g., individually). Therefore, in some aspects, some code blocks (or code block groups) may be successfully decoded and other code blocks (or code block groups) may not be successfully decoded.

As shown by reference number 435, the receiver device 410 may transmit, and the transmitter device 405 may receive, feedback information indicating that the initial transmission of the communication (e.g., the transport block) was not successfully decoded by the receiver device 410. For example, the receiver device 410 may transmit an indication of the decoding results from the initial transmission of the communication. For example, the indication that the initial transmission of the communication (e.g., the transport block) was not successfully decoded by the receiver device 410 may be NACK feedback or may be the absence of ACK feedback.

In some aspects, the feedback information may be for each transport block transmitted by the transmitter device 405. For example, for the transport block transmitted in the initial transmission of the communication, the receiver device 410 may transmit feedback information (e.g., indicating decoding results) for the entire transport block. In some other aspects, the feedback information may be for each code block or each code block group transmitted by the transmitter device 405. For example, the receiver device 410 may transmit feedback information (e.g., indicating decoding results) for each code block or each code block group included in the transport block. This may improve performance (e.g., throughput) of the communication as the transmitter device 405 may be enabled to transmit additional redundancy bits only for code blocks or code block groups that have not been successfully decoded by the receiver device 410. For example, this may enable a code block or a code block group to use a higher code rate or a higher MCS (e.g., the overestimated code rate and/or the overestimated MCS), which may improve performance (e.g., throughput) for the code block or the code block group. In some aspects, providing feedback for each code block or code block group (rather than only providing feedback for the entire transport block) may enable the communication to achieve improved performance (e.g., throughput) over even an optimal MCS for the channel (e.g., as the optimal MCS is the optimal MCS for the entire transport block and the feedback for each code block allows a higher code rate or higher MCS (than the optimal code rate or the optimal MCS) to be used for some code blocks of the transport block).

In some aspects, the feedback information may include additional information to support a determination of an acceptable code rate for the communication. For example, the receiver device 410 may transmit (e.g., in the feedback information) an indication of a code rate (or an MCS or a spectral efficiency) that can be supported for the communication (e.g., an allowable code rate for the communication). This may enable the transmitter device 405 to reduce a latency associated with converging to the acceptable (or supported) code rate for the communication. For example, a number of retransmissions to reach the acceptable (or supported) code rate for the communication (as described in more detail below) may be reduced based at least in part on the additional information indicated in the feedback information.

As shown by reference number 440, the transmitter device 405 may schedule a retransmission associated with the communication to incrementally lower the code rate for the communication (e.g., for the transport block). For example, the retransmission may include a small number of bits (e.g., a lower number of bits than a number of bits included in the initial transmission of the communication). For example, the retransmission may only include a number of bits needed to lower the code rate (or the MCS or spectral efficiency) of the communication by an amount. For example, the transmitter device 405 may select a number of additional bits from the set of coded bits associated with the communication (e.g., stored in the buffer) to transmit in the retransmission. In some other aspects, the retransmission may include similar, or more, bits than the number of bits included in the initial transmission of the communication. For example, if the feedback information indicates an allowable or achievable code rate, then the retransmission may include a number of additional bits to reach the indicated code rate (e.g., which may result in the retransmission including a similar, or more, bits than the number of bits included in the initial transmission of the communication).

The additional bits transmitted in the retransmission may be used to incrementally lower the effective code rate for the communication (e.g., for the transport block or for individual code blocks). In some aspects, each retransmission may include a number of bits needed to lower an MCS of the communication to a next lower MCS. For example, if the initial MCS (e.g., the overestimated MCS) is an MCS associated with the index 28, then the first retransmission may include a number of redundancy bits needed to lower the MCS for the communication (e.g., for the transport block) to an MCS associated with the index 27. Similarly, a second retransmission (if the entire transport block is not successfully decoded after transmitting the first retransmission) may include a number of redundancy bits needed to lower the MCS for the communication (e.g., for the transport block) to an MCS associated with the index 26.

For example, the transmitter device 405 may continue to schedule and transmit small sized retransmissions (e.g., with each retransmission incrementally lowering the effective code rate or MCS for the communication) until the transmitter device 405 receives feedback information indicating that the entire communication (e.g., the entire transport block and/or all code blocks) have been successfully decoded by the receiver device 410.

In some aspects, the number of additional bits in each retransmission and/or a content of each retransmission (e.g., which bits are selected from the coded bits for the communication for each retransmission) may be defined or indicated by a redundancy version. For example, a retransmission described herein may be referred to as a redundancy version. For example, a redundancy version may indicate a set of coded bits that are to be transmitted for a small sized retransmission, as described herein. For example, redundancy version information associated with retransmissions may indicate a size (e.g., a number of redundancy bits) and a content (e.g., the particular bits that are selected to be included in the set of coded bits for the retransmission) of the retransmissions. In some aspects, the content for a retransmission may be defined by a starting bit location in the buffer (e.g., the cyclic buffer or a circular buffer) that stores the coded bits for the communication.

For example, in some aspects, a size of a retransmission (e.g., a redundancy version size) may be indicated in downlink control information (DCI) associated with retransmission (or associated with the initial transmission of the communication). For example, the transmitter device 405 may transmit DCI that indicates a size (e.g., a redundancy version size) of one or more retransmissions. In some aspects, the size of a retransmission may be indicated relative to a previous transmission or relative to the initial transmission. For example, the size of a retransmission may be indicated as a change (e.g., a delta redundancy version size) compared to a previous transmission (e.g., a previous retransmission) or to the initial transmission of the communication. For example, a first delta redundancy version size may indicate a size of a first retransmission (e.g., that is to be transmitted after a decoding failure of an initial transmission) and a second delta redundancy version size may indicate a size of a second retransmission (e.g., that is to be transmitted after a decoding failure of the first retransmission), and so on. The first delta redundancy version size may be relative to a size of the initial transmission. The second delta redundancy version size may be relative to the size of the initial transmission or the size of the first retransmission. One or more delta redundancy version sizes may be indicated to the receiver device 410 in DCI, in a similar manner as described above.

In some aspects, a size of a retransmission (e.g., a redundancy version size) may be based at least in part on a redundancy version step size value (e.g., indicating a number of additional bits to be included in the retransmission). For example, a first step size value may indicate a number of additional bits to be transmitted in a first retransmission, a second step size value may indicate a number of additional bits to be transmitted in a second retransmission, a third step size value may indicate a number of additional bits to be transmitted in a third retransmission, and so on. In some aspects, the transmitter device 405 may transmit, to the receiver device 410, an indication of one or more step size values using DCI (e.g., DCI for an initial transmission of a transport block), a radio resource control (RRC) message, and/or a medium access control (MAC) control element (MAC-CE) message.

In some aspects, a step size value for a retransmission may be changed over time by the transmitter device 405 (or by another device associated with the transmitter device 405). For example, a step size value may be based at least in part on an application associated with a communication. For example, a larger step size value may result in fewer retransmissions needed for a successful decoding of the communication. Therefore, for a delay sensitive application, a larger step size value may be used to reduce latency. As another example, a smaller step size value may be used to increase performance (or throughput). In some aspects, a step size value may be based at least in part on a network status. For example, a network status may indicate an interference limitation and/or a thermal limitation, among other examples, associated with the communication. Therefore, the transmitter device 405 may adapt the step size value for one or more retransmissions based at least in part on the network status.

In some aspects, the step size may be the same for each retransmission (e.g., such that only one step size value is used by the transmitter device 405 and/or indicated to the receiver device 410). In some other aspects, different retransmissions may use different step size values. For example, a vector may define, or indicate, a set of step size values for retransmissions. For example, a step size i in the vector may indicate a step size between a transmission i−1 and a transmission i. In this way, the transmitter device 405 may be enabled to use larger step size values for later retransmissions to reduce a latency associated with transmitting the communication. The transmitter device 405 may transmit, to the receiver device 410, an indication of a redundancy version step size vector for retransmissions.

In some aspects, the transmitter device 405 may not indicate a size of the retransmission to the receiver device 410. In such examples, the receiver device 410 may determine a size of a retransmission using a blind detection technique. For example, the receiver device 410 may attempt to decode the retransmission using one or more sizes (e.g., one or more step size values). The receiver device 410 may determine the size of the retransmission based at least in part on the decoding results using the one or more sizes (e.g., one or more step size values).

In some aspects, the transmitter device 405 may determine a size of a retransmission using a step size value, as described above. The transmitter device 405 may transmit, to the receiver device 410, an indication of the size of the transmission (e.g., in DCI, an RRC message, or a MAC-CE message). For example, the transmitter device 405 may internally determine a size of a retransmission using a step size value. The transmitter device 405 may transmit an indication of the determined size of the retransmission using a delta redundancy version size in a similar manner as described above (e.g., rather than transmitting an indication of the step size value).

In some aspects, a content of a retransmission may be indicated using a starting bit location in a buffer (e.g., a cyclic buffer or circular buffer) that stores the coded bits for the communication. Starting bit positions for retransmissions may be sequentially advanced for each retransmission according to a size of a previous transmission in order to contiguously cover the buffer (e.g., a cyclic buffer or a circular buffer). In some aspects, starting bit positions for retransmissions may be defined by a starting position vector. The starting position vector may include a set of elements defining a starting bit location for a set of retransmissions. For example, an element i of the starting position vector may indicate a starting bit position for a retransmission i. As a result, the receiver device 410 may be enabled to perform Chase combining and/or incremental redundancy combining for the retransmissions. For example, in some aspects, Chase combining may be used to improve decoding performance when retransmissions are transmitted using different antennas of the transmitter device 405. In some aspects, the transmitter device 405 may transmit, to the receiver device 410, an indication of the starting position vector. For example, the transmitter device 405 may transmit the indication of the starting position vector using DCI, an RRC message, and/or a MAC-CE message. In some aspects, the transmitter device 405 (or another device) may change or alter the starting position vector over time to improve performance.

Therefore, redundancy version information (e.g., redundancy version size and/or content as described above) may be defined and/or indicated for each retransmission. In some aspects, the transmitter device 405 may transmit, to the receiver device 410, an indication of the redundancy version information for one or more retransmissions. In some aspects, the transmitter device may indicate the redundancy version information for a retransmission using a redundancy version index. The redundancy version index may indicate a sequence of retransmissions to be transmitted by the transmitter device 405. In some aspects, the redundancy version information for the retransmissions associated with the multiple incremental redundancy retransmission scheme described herein may be defined, or otherwise fixed, by a wireless communication standard.

As shown by reference number 445, the transmitter device 405 may transmit, and the receiver device 410 may receive, a first retransmission that includes a number of bits (e.g., redundancy bits) to lower the code rate of the communication from the overestimated code rate to a lower code rate. For example, the first retransmission may include a number of bits that lowers an MCS of the communication (e.g., of the transport block) to a next lower MCS (e.g., according to the MCS indices defined, or otherwise fixed, by a wireless communication standard, such as the 3GPP). As shown by reference number 450, the receiver device 410 may attempt to decode the communication (e.g., the transport block) based at least in part on the initial transmission and the additional bits included in the first retransmission.

In a similar manner as described above in connection with reference number 435, if the receiver device 410 is unable to successfully decode the entire transport block (e.g., all code blocks of the transport block), then the receiver device 410 may transmit feedback information indicating that the communication is not successfully decoded (e.g., may transmit NACK feedback or may not transmit ACK feedback). Similar to the feedback information described above, the receiver device 410 may transmit feedback information (e.g., decoding results) for the entire transport block or may transmit feedback information (e.g., decoding results) for each code block or each code block group.

The transmitter device 405 may receive the feedback information associated with the first retransmission and may select, schedule, and transmit a second retransmission that includes a small number of additional bits. For example, the second retransmission may include a number of additional bits (e.g., redundancy bits) that are needed to lower the code rate from the code rate after the first retransmission to a lower code rate. For example, the second retransmission may include a number of bits to lower an MCS of the communication (e.g., of the transport block) to a next lower MCS (e.g., according to the MCS indices defined, or otherwise fixed, by a wireless communication standard, such as the 3GPP). For example, if the MCS of the communication after the first retransmission is MCS 26, then the second retransmission may only include a number of coded bits needed to lower the MCS of the communication to MCS 25. The receiver device 410 may attempt to decode the communication (e.g., the transport block) using the coded bits from the initial transmission, the first retransmission, and the second retransmission in a similar manner as described above.

This process (of scheduling and transmitting small sized retransmissions to incrementally lower the code rate or MCS of the communication based at least in part on feedback provided by the receiver device 410) may continue until the transmitter device 405 receives feedback information, from the receiver device 410, indicating that the entire communication (e.g., the entire transport block) has been successfully decoded or until a number of retransmission for a transport block is satisfies a threshold and/or until an the acceptable latency associated with the transport block is exceeded. For example, the receiver device 410 may successfully decode all code blocks and/or code block groups of the transport block using the coded bits transmitted in the initial transmission and/or one or more subsequent retransmissions. As shown by reference number 455, the receiver device 410 may transmit, and the transmitter device 405 may receive, feedback information indicating that the communication (e.g., the entire transport block) has been successfully decoded by the receiver device 410. For example, the feedback information may indicate an ACK feedback for the communication.

Therefore, the effective code rate (or the effective MCS) for the communication (e.g., for the transport block) may be based at least in part on the number of coded bits transmitted in the initial transmission of the communication and the number of coded bits transmitted in any subsequent retransmissions, as described above. Therefore, the transmitter device 405 and the receiver device 410 may be enabled to incrementally approach the actual supported maximum code rate (or MCS) for a communication by using the small sized retransmissions, as described above. This improves communication performance, throughput, and/or spectral efficiency for a communication by ensuring that the actual supported maximum code rate (or MCS) for the communication is used. For example, the transmitter device 405 and the receiver device 410 may be enabled to use a higher code rate and/or a higher MCS (compared to a code rate or MCS that would have otherwise been used based on CSI-RS or an OLLA selection scheme) by utilizing the small sized retransmissions. Moreover, the multiple incremental redundancy retransmission scheme enables the transmitter device 405 and the receiver device 410 to incrementally approach the actual supported maximum code rate (or MCS) for a communication regardless of a velocity or movement of the receiver device 410 (e.g., because the multiple small sized retransmissions enable the code rate or MCS to accurately track or adapt to changing channel conditions in close to real time). Additionally, the multiple incremental redundancy retransmission scheme described herein enables a code rate or MCS to track or adapt to an optimal code rate or optimal MCS for a channel over time (e.g., as channel conditions vary). This enables a communication transmitted using the multiple incremental redundancy retransmission scheme to achieve a higher throughput (e.g., compared to other retransmission schemes) over a large SNR range.

As indicated above, FIG. 4 is provided as an example. Other examples may differ from what is described with respect to FIG. 4.

Figure 5:
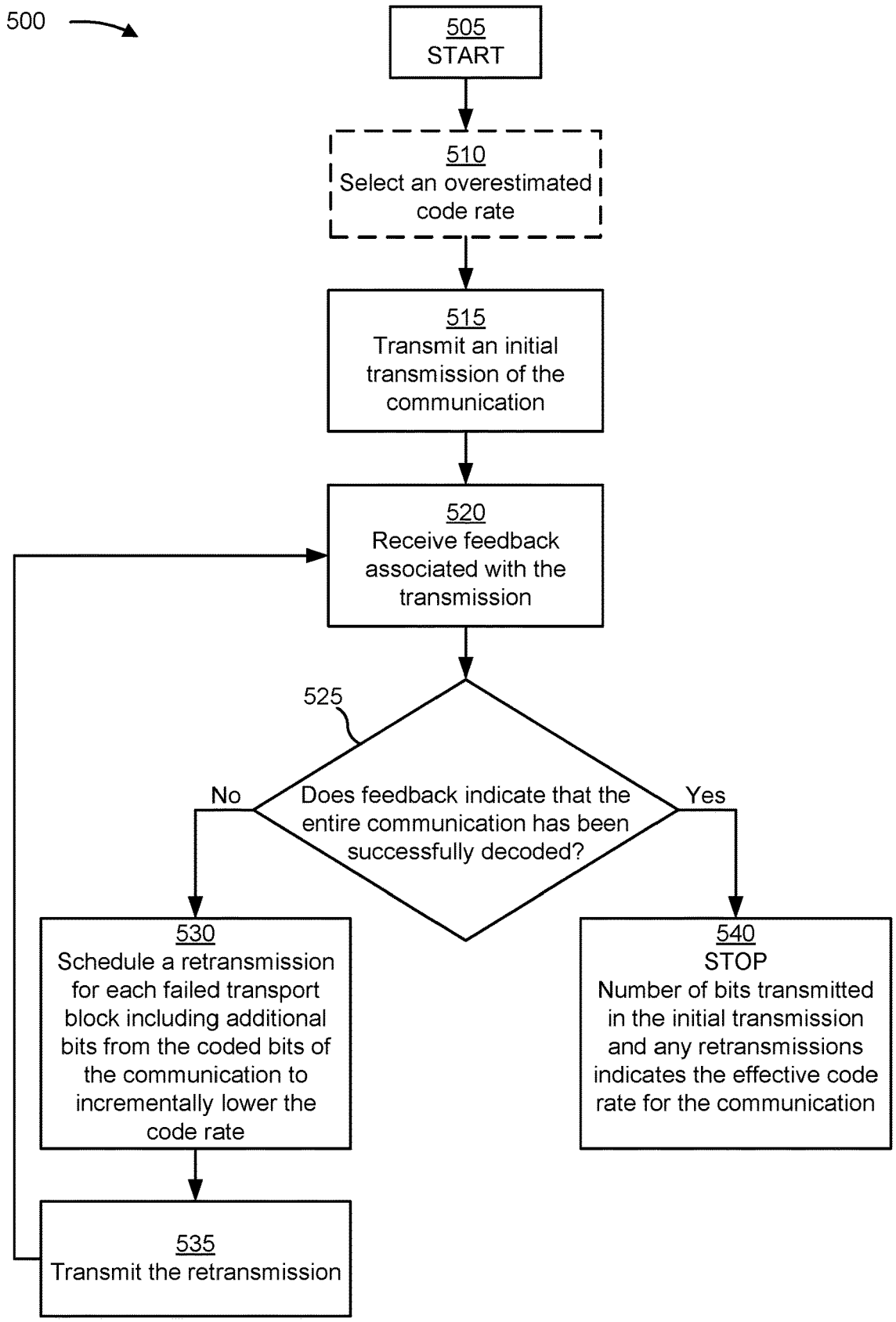

FIG. 5 is a diagram illustrating an example process 500 associated with a multiple incremental redundancy retransmission scheme, in accordance with the present disclosure. Example process 500 may be performed by a transmitter device, such as the transmitter device 405 depicted and described in connection with FIG. 4.

As shown in FIG. 5, the example process 500 may start for a communication associated with a multiple incremental redundancy retransmission scheme as described herein (block 505). For example, the transmitter device may generate a set of coded bits (e.g., including information bits and parity or redundancy bits) for the communication. The transmitter device may store the set of coded bits in a buffer (e.g., a cyclic buffer or a circular buffer) for an initial transmission and any required retransmissions, as described in more detail elsewhere herein.

The transmitter device may select an overestimated code rate for an initial transmission of the communication (block 510). For example, the transmitter device may select a code rate (and/or an MCS or spectral efficiency) that is greater than an acceptable or determined code rate that is based at least in part on the CSI for the channel. For example, an overestimated code rate may be a code rate that is associated with a throughput or spectral efficiency (or that results in a throughput or spectral efficiency) that is greater than an estimated achievable throughput (or estimated achievable spectral efficiency) for the channel. For example, the selected overestimated code rate (and/or overestimated MCS or overestimated spectral efficiency) may be expected to result in the need for one or more retransmissions of the communication (e.g., after a transmission of the initial communication). In other words, the selected overestimated code rate (and/or overestimated MCS or overestimated spectral efficiency) may result in the initial transmission of the communication being not decodable by a receiver device.

As described elsewhere herein, in some aspects, the transmitter device may select the code rate for the initial transmission of the communication by selecting a highest available or configured code rate. In some other aspects, the selected code rate for the initial transmission of the communication may not be overestimated (e.g., may be expected to result in a successful transmission and decoding of the communication). The selection of the overestimated code rate (and/or overestimated MCS or overestimated spectral efficiency) is described in more detail above in connection with FIG. 4 (e.g., and reference number 420).

The transmitter device may transmit the initial transmission of the communication (block 515). In some aspects, the initial transmission may use the overestimated code rate (and/or overestimated MCS or overestimated spectral efficiency). For example, the transmitter device may transmit the initial transmission including a transport block associated with the communication. A size of the transport block and/or other coding parameters may be based at least in part on the selected overestimated code rate (and/or overestimated MCS or overestimated spectral efficiency).

The transmitter device may receive, from the receiver device, feedback (e.g., feedback information) associated with the transmission (block 520). For example, the transmitter device may receive feedback information associated with the initial transmission of the communication. In some aspects, the feedback information may indicate decoding results associated with the initial transmission of the communication. As described above, the feedback information may be for the entire transport block transmitted by the transmitter device. In some aspects, the transmitter device may receive separate feedback information for each code block and/or for each code block group associated with the transport block.

The transmitter device may determine whether the feedback information indicates that the entire communication (e.g., an entire transport block) has been successfully decoded (block 525). For example, the transmitter device may determine whether ACK feedback has been received from the receiver device associated with the communication. If the feedback information indicates that the entire communication has not been successfully decoded (block 525— No), then the transmitter device may schedule a retransmission for a failed transport block (for each transport block that was not successfully decoded), where the retransmission includes a number of coded bits from the set of coded bits associated with the communication to incrementally lower the code rate for the communication (block 530). For example, the feedback information may indicate NACK feedback and/or may not indicate ACK feedback. Therefore, the transmitter device may determine that the communication has not been successfully decoded by the receiver device.

As described above, the retransmission may be a small sized retransmission (e.g., may include a small number of coded bits compared to the number of coded bits included in the initial transmission of the communication). For example, the retransmission may only include a number of coded bits needed to incrementally lower the code rate by some amount. For example, the retransmission may only include a number of coded bits needed to lower an MCS of the communication from a first MCS (e.g., MCS M) to a next lower MCS (e.g., MCS M−1) as defined in an MCS table.

In some aspects, the retransmission may only include coded bits for code blocks that were not successfully decoded by the receiver device. For example, if the feedback information indicates decoding results for each code block or for each code block group, then the transmitter device may be enabled to identify which code blocks or code block groups of the transport block were not successfully decoded. The transmitter device may only select coded bits to be included in the retransmission that are associated with the code blocks of the transport block were not successfully decoded. As described above, this may enable a code block that was successfully decoded using the higher code rate (e.g., the overestimated code rate) to not have the code rate for the code block lowered by the retransmission. Using a higher code rate for code blocks that were successfully transmitted may improve a throughput level for the communication.

As described above, the transmitter device may select coded bits based at least in part on redundancy version information associated with the retransmission. For example, as described above, redundancy version information (e.g., a size and/or content of a retransmission) may be determined and/or defined for one or more retransmissions. The transmitter device may use the redundancy version information associated with the retransmission to select the coded bits from the buffer to be included in the retransmission.

The transmitter device may transmit the retransmission to the receiver device (block 535). As described above, the transmission of the retransmission may incrementally lower the effective code rate for the communication by transmitting the small number of additional coded bits. The receiver device may attempt to decode the communication using the coded bits transmitted in the initial transmission and the coded bits transmitted in the retransmission. In a similar manner as described above, the transmitter device may receive, from the receiver device, feedback (e.g., feedback information) associated with the transmission (e.g., of the retransmission) (block 520). The transmitter device may determine whether the feedback information associated with the retransmission indicates that the entire communication (e.g., the entire transport block) has been successfully decoded (block 525). If the feedback information indicates that the entire communication (e.g., the entire transport block) has not been successfully decoded (block 525—No), then the transmitter device may schedule another retransmission to incrementally lower the code rate for the communication (block 530) and may transmit the other retransmission (block 535).

The transmitter device may perform a feedback loop for the communication (e.g., including blocks 520, 525, 530, and 535) to incrementally lower the code rate using small sized retransmissions until the transmitter device determines that feedback information from the receiver device indicates that the entire communication has been successfully decoded (block 525—Yes). If the feedback information from the receiver device indicates that the entire communication has been successfully decoded (block 525—Yes), then the example process 500 may stop (block 540) as the communication has been successfully transmitted and decoded. In some aspects, the example process 500 may stop (block 540) based at least in part on a number retransmissions transmitted by the transmitter device satisfying a threshold. Additionally, or alternatively, the example process 500 may stop (block 540) based at least in part on a latency associated with the transport block exceeding a latency threshold. Additionally, or alternatively, the example process 500 may stop (block 540) based at least in part on an effective code rate for the communication reaching a lowest supported or configured code rate. As described above, the number of coded bits transmitted in the initial transmission (block 515) and any subsequent retransmissions (block 535) may indicate the effective code rate for the communication. As a result, the transmitter device may be enabled to incrementally lower the code rate for the communication using the small sized retransmissions until the receiver device is enabled to successfully decode the entire communication (e.g., the entire transport block). Therefore, the code rate for the communication may approach or more closely align with the optimal or achievable code rate for the communication (e.g., based on CSI for the channel). As described above, in some aspects (such as where the receiver device provides feedback for each code block or each code block group), some code blocks of the communication may be transmitted using different code rates than other code blocks of the communication. As a result, throughput for the communication may exceed an expected achievable throughput (that is determined for the entire transport block) as the transmitter device is enabled to transmit some code blocks using a higher code rate than other code blocks.

As indicated above, FIG. 5 is provided as an example. Other examples may differ from what is described with respect to FIG. 5.

Figure 6:
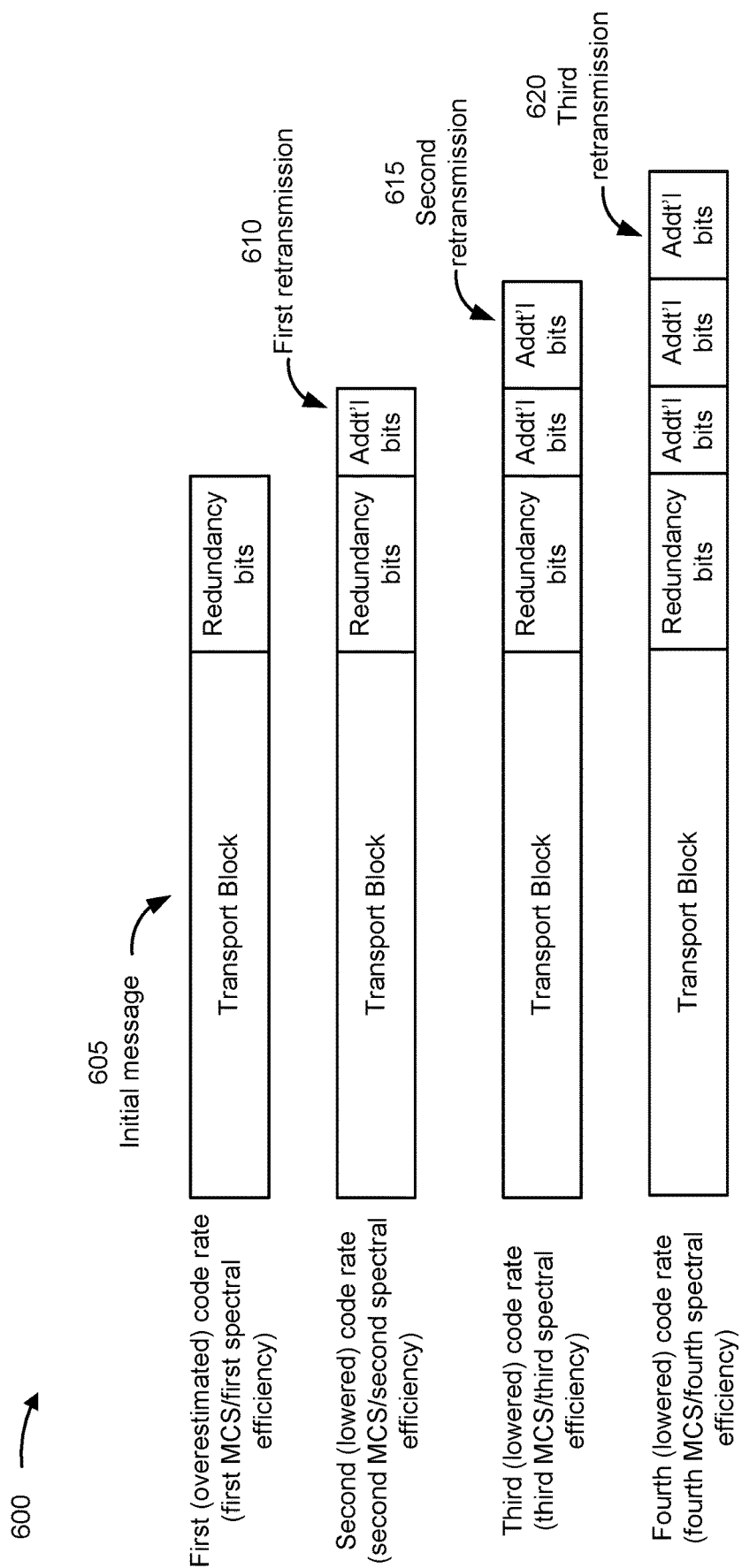

FIG. 6 is a diagram illustrating an example 600 associated with a multiple incremental redundancy retransmission scheme, in accordance with the present disclosure. FIG. 6 depicts an initial message 605 and retransmissions 610, 615, and 620 of a communication. For example, the communication may be transmitted by a transmitter device, such as the transmitter device 405 depicted and described in connection with FIG. 4 and/or the transmitter device described in connection with FIG. 5. For example, the initial message 605 and retransmissions 610, 615, and 620 of a communication may be generated and/or transmitted using one or more (or all) of the operations described above in connection with FIGS. 4 and/or 5.

For example, as shown in FIG. 6, the initial message 605 may include a transport block that includes a payload (e.g., information bits) and one or more redundancy bits. The initial transmission may use a first code rate, first MCS, and/or first spectral efficiency. As described in more detail elsewhere herein, the first code rate, first MCS, and/or first spectral efficiency may be overestimated (e.g., for the channel) and/or may be a highest available or configured code rate, MCS, and/or spectral efficiency.

The first retransmission 610 may include a number of additional coded bits (e.g., from a set of bits associated with the transport block). For example, the first retransmission 610 may only include the additional bits (e.g., and not the coded bits transmitted in the initial message 605 as depicted in in FIG. 6). For example, a receiver device may be unable to successfully decode the transport block using the initial message 605. Therefore, the transmitter device may schedule and/or transmit the first retransmission 610 to incrementally lower the code rate, MCS, and/or spectral efficiency for the communication. As described in more detail elsewhere herein, the number of additional coded bits included in the first retransmission 610 may lower the code rate, MCS, and/or spectral efficiency for the communication to a second code rate, second MCS, and/or second spectral efficiency.

The second retransmission 615 may include a number of additional coded bits (e.g., from the set of bits associated with the transport block). For example, the second retransmission 615 may only include the additional bits (e.g., and not the coded bits transmitted in the initial message 605 or the additional bits transmitted in the first retransmission 610 as depicted in in FIG. 6). For example, a receiver device may be unable to successfully decode the transport block using the initial message 605 and the first retransmission 610. Therefore, the transmitter device may schedule and/or transmit the second retransmission 615 to incrementally lower the code rate, MCS, and/or spectral efficiency for the communication. As described in more detail elsewhere herein, the number of additional coded bits included in the second retransmission 615 may lower the code rate, MCS, and/or spectral efficiency for the communication to a third code rate, third MCS, and/or third spectral efficiency.

The third retransmission 620 may include a number of additional coded bits (e.g., from the set of bits associated with the transport block). For example, the third retransmission 620 may only include the additional bits (e.g., and not the coded bits transmitted in the initial message 605, the additional bits transmitted in the first retransmission 610, or the additional bits transmitted in the second retransmission 615, as depicted in in FIG. 6). For example, a receiver device may be unable to successfully decode the transport block using the initial message 605, the first retransmission 610, and the second retransmission 615. Therefore, the transmitter device may schedule and/or transmit the third retransmission 620 to incrementally lower the code rate, MCS, and/or spectral efficiency for the communication. As described in more detail elsewhere herein, the number of additional coded bits included in the third retransmission 620 may lower the code rate, MCS, and/or spectral efficiency for the communication to a third code rate, third MCS, and/or third spectral efficiency.

As a result, the transmitter device may be enabled to incrementally lower the effective code rate for the communication using the small sized retransmissions 610, 615, and 620. For example, if the receiver device is enabled to successfully decode the communication (e.g., the entire transport block) after the transmission of the third retransmission, then the effective code rate for the communication (e.g., for the transport block) may be based at least in part on the number of coded bits transmitted in the initial message 605, the first retransmission 610, the second retransmission 615, and the third retransmission 620.

The initial message 605, the first retransmission 610, the second retransmission 615, and the third retransmission 620 may be transmitted in different time windows (e.g., in different slots). For example, the transmitter device may transmit the initial message 605 in a first slot. The transmitter device may transmit the first retransmission 610 in a second slot (e.g., may transmit only the additional bits for the first retransmission 610 indicated in FIG. 6 in the second slot). The transmitter device may transmit the second retransmission 615 in a third slot (e.g., may transmit only the additional bits for the second retransmission 615 indicated in FIG. 6 in the third slot). The transmitter device may transmit the third retransmission 620 in a fourth slot (e.g., may transmit only the additional bits for the third retransmission 620 indicated in FIG. 6 in the fourth slot). As the retransmissions 610, 615, and/or 620 may be small sized retransmissions, the transmitter device may be enabled to transmit multiple retransmissions for different transport blocks in the same slot. For example, in the second slot, the transmitter device may transmit the first retransmission 610 and a different retransmission for a different transport block (not shown in FIG. 6).

As indicated above, FIG. 6 is provided as an example. Other examples may differ from what is described with respect to FIG. 6.

FIG. 7 is a diagram illustrating an example process 700 performed, for example, by a transmitter device, in accordance with the present disclosure. Example process 700 is an example where the transmitter device (e.g., the transmitter device depicted in and/or described in connection with FIGS. 4-6) performs operations associated with a multiple incremental redundancy retransmission scheme.

As shown in FIG. 7, in some aspects, process 700 may include transmitting, to a receiver device, an initial message associated with a communication using a first code rate (block 710). For example, the transmitter device (e.g., using communication manager 140 or communication manager 150 and/or transmission component 904, depicted in FIG. 9) may transmit, to a receiver device, an initial message associated with a communication using a first code rate, as described above.

As further shown in FIG. 7, in some aspects, process 700 may include receiving, from the receiver device, first feedback information indicating that the communication was not successfully decoded by the receiver device (block 720). For example, the transmitter device (e.g., using communication manager 140 or communication manager 150 and/or reception component 902, depicted in FIG. 9) may receive, from the receiver device, first feedback information indicating that the communication was not successfully decoded by the receiver device, as described above.

As further shown in FIG. 7, in some aspects, process 700 may include transmitting, to the receiver device based at least in part on the reception of the first feedback information, one or more retransmissions associated with the communication including a first retransmission, where the first retransmission includes a first number of bits from a set of bits associated with the communication, where the first number of bits lowers an effective code rate of the communication to a second code rate (block 730). For example, the transmitter device (e.g., using communication manager 140 or communication manager 150 and/or transmission component 904, depicted in FIG. 9) may transmit, to the receiver device based at least in part on the reception of the first feedback information, one or more retransmissions associated with the communication including a first retransmission, where the first retransmission includes a first number of bits from a set of bits associated with the communication, where the first number of bits lowers an effective code rate of the communication to a second code rate, as described above.

As further shown in FIG. 7, in some aspects, process 700 may include receiving, from the receiver device, second feedback information indicating that the communication was successfully decoded by the receiver device, where the effective code rate for the communication is based at least in part on a second number of bits included in the initial message and the first number of bits included in the first retransmission (block 740). For example, the transmitter device (e.g., using communication manager 140 or communication manager 150 and/or reception component 902, depicted in FIG. 9) may receive, from the receiver device, second feedback information indicating that the communication was successfully decoded by the receiver device, where the effective code rate for the communication is based at least in part on a second number of bits included in the initial message and the first number of bits included in the first retransmission, as described above.

Process 700 may include additional aspects, such as any single aspect or any combination of aspects described below and/or in connection with one or more other processes described elsewhere herein.

In a first aspect, transmitting the one or more retransmissions associated with the communication includes receiving, from the receiver device after the transmission of the first retransmission, third feedback information indicating that the communication was not successfully decoded using the first retransmission, and transmitting, to the receiver device based at least in part on the reception of the third feedback information, a second retransmission of the one or more retransmissions, where the second retransmission includes a third number of bits from the set of bits associated with the communication, where the third number of bits lowers the effective code rate of the communication from the second code rate to a third code rate, and the reception of the second feedback information indicating that the communication was successfully decoded is based at least in part on the transmission of the second retransmission, and where the effective code rate for the communication is based at least in part on the second number of bits included in the initial message, the first number of bits included the first retransmission, and the third number of bits included in the second retransmission.

In a second aspect, alone or in combination with the first aspect, receiving the first feedback information includes at least one of receiving feedback information for a transport block associated with the communication, receiving feedback information for a code block associated with the communication, or receiving feedback information for a code block group associated with the communication.

In a third aspect, alone or in combination with one or more of the first and second aspects, receiving the first feedback information includes receiving, from the receiver device, information indicating an allowable code rate for the communication.

In a fourth aspect, alone or in combination with one or more of the first through third aspects, transmitting the one or more retransmissions associated with the communication includes at least one of transmitting the first retransmission including the first number of bits for all code blocks of a transport block associated with the communication that was not successfully decoded by the receiver device, transmitting the first retransmission including the first number of bits for one or more code blocks associated with the communication that were not successfully decoded by the receiver device, or transmitting the first retransmission including the first number of bits for one or more code block groups associated with at least one code block that was not successfully decoded by the receiver device.

In a fifth aspect, alone or in combination with one or more of the first through fourth aspects, process 700 includes receiving, from the receiver device, a channel state information report for the channel, estimating, based at least in part on the channel state information report, an achievable throughput for the channel, and selecting the first code rate to be associated with the throughput that is greater than the estimated achievable throughput for the channel.

In a sixth aspect, alone or in combination with one or more of the first through fifth aspects, process 700 includes performing outer loop link adaptation to select the first code rate using a target block error rate that is associated with a value that is greater than a threshold value.

In a seventh aspect, alone or in combination with one or more of the first through sixth aspects, process 700 includes transmitting, to the receiver device, redundancy version information associated with retransmissions of the communication, wherein the redundancy version information indicates a size and a content of each retransmission associated with the communication.

In an eighth aspect, alone or in combination with one or more of the first through seventh aspects, process 700 includes transmitting, to the receiver device, redundancy version information indicating a size of the one or more retransmissions via a downlink control information message.

In a ninth aspect, alone or in combination with one or more of the first through eighth aspects, process 700 includes transmitting, to the receiver device, redundancy version information indicating a size of the one or more retransmissions relative to a size of the communication or a size of a previous retransmission.

In a tenth aspect, alone or in combination with one or more of the first through ninth aspects, a size of the first retransmission is based at least in part on a redundancy version step size value associated with the first retransmission, wherein the redundancy version step size value indicates the first number of bits included in the first retransmission.

In an eleventh aspect, alone or in combination with one or more of the first through tenth aspects, process 700 includes transmitting, to the receiver device, redundancy version information indicating a redundancy version step size value associated with the one or more retransmissions that indicates a size of the one or more retransmissions via at least one of a downlink control information message, a radio resource control message, or a medium access control (MAC) control element (MAC-CE) message.

In a twelfth aspect, alone or in combination with one or more of the first through eleventh aspects, a size of the one or more retransmissions is based at least in part on a redundancy version step size value that is based at least in part on a network status or an application associated with the communication.

In a thirteenth aspect, alone or in combination with one or more of the first through twelfth aspects, a size of the one or more retransmissions is based at least in part on a redundancy version step size vector, wherein the redundancy version step size vector indicates redundancy version step size values for the one or more retransmissions.

In a fourteenth aspect, alone or in combination with one or more of the first through thirteenth aspects, the redundancy version step size vector indicates a first redundancy version step size value for the first retransmission and a second redundancy version step size value for a second retransmission.

In a fifteenth aspect, alone or in combination with one or more of the first through fourteenth aspects, a size of the one or more retransmissions is determined by the receiver device using a blind detection technique.

In a sixteenth aspect, alone or in combination with one or more of the first through fifteenth aspects, process 700 includes determining a size of the one or more retransmissions based at least in part on a redundancy version step size value associated with the first retransmission, and transmitting, to the receiver device, an indication of the size of the one or more retransmissions.

In a seventeenth aspect, alone or in combination with one or more of the first through sixteenth aspects, process 700 includes transmitting, to the receiver device via downlink control information, redundancy version information indicating a content of the one or more retransmissions using a starting position of a number of bits associated with each retransmission included in the one or more retransmissions in a cyclic buffer.

In an eighteenth aspect, alone or in combination with one or more of the first through seventeenth aspects, a starting position of a number of bits associated with each retransmission included in the one or more retransmissions in a cyclic buffer is based at least in part on a size of a previous transmission and a starting position of the previous transmission.

In a nineteenth aspect, alone or in combination with one or more of the first through eighteenth aspects, a starting position of a number of bits associated with each retransmission included in the one or more retransmissions in a cyclic buffer is based at least in part on a starting position vector, wherein the starting position vector indicates a starting position for the one or more retransmissions.

In a twentieth aspect, alone or in combination with one or more of the first through nineteenth aspects, process 700 includes transmitting, to the receiver device, an indication of the starting position vector via at least one of a downlink control information message, a radio resource control message, or a MAC-CE message.

In a twenty-first aspect, alone or in combination with one or more of the first through twentieth aspects, the first code rate is associated with a first spectral efficiency or a first MCS and the second code rate is associated with a second spectral efficiency or a second MCS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a receiver device, in accordance with the present disclosure. Example process 800 is an example where the receiver device (e.g., the receiver device depicted in and/or described in connection with FIGS. 4-6) performs operations associated with a multiple incremental redundancy retransmission scheme.

As shown in FIG. 8, in some aspects, process 800 may include receiving, from a transmitter device, an initial message associated with a communication using a first code rate (block 810). For example, the receiver device (e.g., using communication manager 140 or communication manager 150 and/or reception component 1002, depicted in FIG. 10) may receive, from a transmitter device, an initial message associated with a communication using a first code rate, as described above.

As further shown in FIG. 8, in some aspects, process 800 may include transmitting, to the transmitter device, first feedback information indicating that the communication was not successfully decoded by the receiver device (block 820). For example, the receiver device (e.g., using communication manager 140 or communication manager 150 and/or transmission component 1004, depicted in FIG. 10) may transmit, to the transmitter device, first feedback information indicating that the communication was not successfully decoded by the receiver device, as described above.

As further shown in FIG. 8, in some aspects, process 800 may include receiving, from the transmitter device based at least in part on the transmission of the first feedback information, one or more retransmissions associated with the communication including a first retransmission, where the first retransmission includes a first number of bits from a set of bits associated with the communication, where the first number of bits lowers an effective code rate of the communication to a second code rate (block 830). For example, the receiver device (e.g., using communication manager 140 or communication manager 150 and/or reception component 1002, depicted in FIG. 10) may receive, from the transmitter device based at least in part on the transmission of the first feedback information, one or more retransmissions associated with the communication including a first retransmission, where the first retransmission includes a first number of bits from a set of bits associated with the communication, where the first number of bits lowers an effective code rate of the communication to a second code rate, as described above.

As further shown in FIG. 8, in some aspects, process 800 may include transmitting, to the transmitter device, second feedback information indicating that the communication was successfully decoded by the receiver device, where the effective code rate for the communication is based at least in part on a second number of bits included in the initial message and the first number of bits included in the first retransmission (block 840). For example, the receiver device (e.g., using communication manager 140 or communication manager 150 and/or transmission component 1004, depicted in FIG. 10) may transmit, to the transmitter device, second feedback information indicating that the communication was successfully decoded by the receiver device, where the effective code rate for the communication is based at least in part on a second number of bits included in the initial message and the first number of bits included in the first retransmission, as described above.

Process 800 may include additional aspects, such as any single aspect or any combination of aspects described below and/or in connection with one or more other processes described elsewhere herein.

In a first aspect, receiving the one or more retransmissions includes transmitting, to the transmitter device after the transmission of the first retransmission, third feedback information indicating that the communication was not successfully decoded using the first retransmission, and receiving, from the transmitter device based at least in part on the transmission of the third feedback information, a second retransmission of the one or more retransmissions, where the second retransmission includes a third number of bits from the set of bits associated with the communication, where the third number of bits lowers the effective code rate of the communication from the second code rate to a third code rate, wherein the transmission of the second feedback information indicating that the communication was successfully decoded is based at least in part on the reception of the second retransmission, and the effective code rate for the communication is based at least in part on the second number of bits included in the initial message, the first number of bits included the first retransmission, and the third number of bits included in the second retransmission.

In a second aspect, alone or in combination with the first aspect, transmitting the first feedback information includes at least one of transmitting feedback information for a transport block associated with the communication, transmitting feedback information for a code block associated with the communication, or transmitting feedback information for a code block group associated with the communication.

In a third aspect, alone or in combination with one or more of the first and second aspects, transmitting the first feedback information includes transmitting, to the transmitter device, information indicating an allowable code rate for the communication.

In a fourth aspect, alone or in combination with one or more of the first through third aspects, receiving the one or more retransmissions associated with the communication includes at least one of receiving the first retransmission including the first number of bits for all code blocks of a transport block associated with the communication that was not successfully decoded by the receiver device, receiving the first retransmission including the first number of bits for one or more code blocks associated with the communication that were not successfully decoded by the receiver device, or receiving the first retransmission including the first number of bits for one or more code block groups associated with at least one code block that was not successfully decoded by the receiver device.

In a fifth aspect, alone or in combination with one or more of the first through fourth aspects, process 800 includes receiving, from the transmitter device, redundancy version information associated with retransmissions of the communication, wherein the redundancy version information indicates a size and a content of each retransmission associated with the communication.

In a sixth aspect, alone or in combination with one or more of the first through fifth aspects, process 800 includes receiving, from the transmitter device, redundancy version information indicating a size of the one or more retransmissions via a downlink control information message.

In a seventh aspect, alone or in combination with one or more of the first through sixth aspects, process 800 includes receiving, from the transmitter device, redundancy version information indicating a size of the one or more retransmissions relative to a size of the communication or a size of a previous retransmission.

In an eighth aspect, alone or in combination with one or more of the first through seventh aspects, a size of the first retransmission is based at least in part on a redundancy version step size value associated with the first retransmission, wherein the redundancy version step size value indicates the first number of bits included in the first retransmission.

In a ninth aspect, alone or in combination with one or more of the first through eighth aspects, process 800 includes receiving, from the transmitter device, redundancy version information indicating a redundancy version step size value associated with the one or more retransmissions that indicates a size of the one or more retransmissions via at least one of a downlink control information message, a radio resource control message, or a MAC-CE message.

In a tenth aspect, alone or in combination with one or more of the first through ninth aspects, a size of the one or more retransmissions is based at least in part on a redundancy version step size value that is based at least in part on a network status or an application associated with the communication.

In an eleventh aspect, alone or in combination with one or more of the first through tenth aspects, a size of the one or more retransmissions is based at least in part on a redundancy version step size vector, wherein the redundancy version step size vector indicates redundancy version step size values for the one or more retransmissions.

In a twelfth aspect, alone or in combination with one or more of the first through eleventh aspects, the redundancy version step size vector indicates a first redundancy version step size value for the first retransmission and a second redundancy version step size value for a second retransmission.

In a thirteenth aspect, alone or in combination with one or more of the first through twelfth aspects, process 800 includes determining a size of the one or more retransmissions using a blind detection technique.

In a fourteenth aspect, alone or in combination with one or more of the first through thirteenth aspects, process 800 includes receiving, from the transmitter device via downlink control information, redundancy version information indicating a content of the one or more retransmissions using a starting position of a number of bits associated with each retransmission included in the one or more retransmissions in a cyclic buffer.

In a fifteenth aspect, alone or in combination with one or more of the first through fourteenth aspects, a starting position of a number of bits associated with each retransmission included in the one or more retransmissions in a cyclic buffer is based at least in part on a size of a previous transmission and a starting position of the previous transmission.

In a sixteenth aspect, alone or in combination with one or more of the first through fifteenth aspects, a starting position of a number of bits associated with each retransmission included in the one or more retransmissions in a cyclic buffer is based at least in part on a starting position vector, wherein the starting position vector indicates a starting position for the one or more retransmissions.

In a seventeenth aspect, alone or in combination with one or more of the first through sixteenth aspects, process 800 includes receiving, from the transmitter device, an indication of the starting position vector via at least one of a downlink control information message, a radio resource control message, or a MAC-CE message.

In an eighteenth aspect, alone or in combination with one or more of the first through seventeenth aspects, the first code rate is associated with a first spectral efficiency or a first MCS and the second code rate is associated with a second spectral efficiency or a second MCS.

In a nineteenth aspect, alone or in combination with one or more of the first through eighteenth aspects, the first code rate is associated with a throughput that is greater than an estimated achievable throughput for the channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
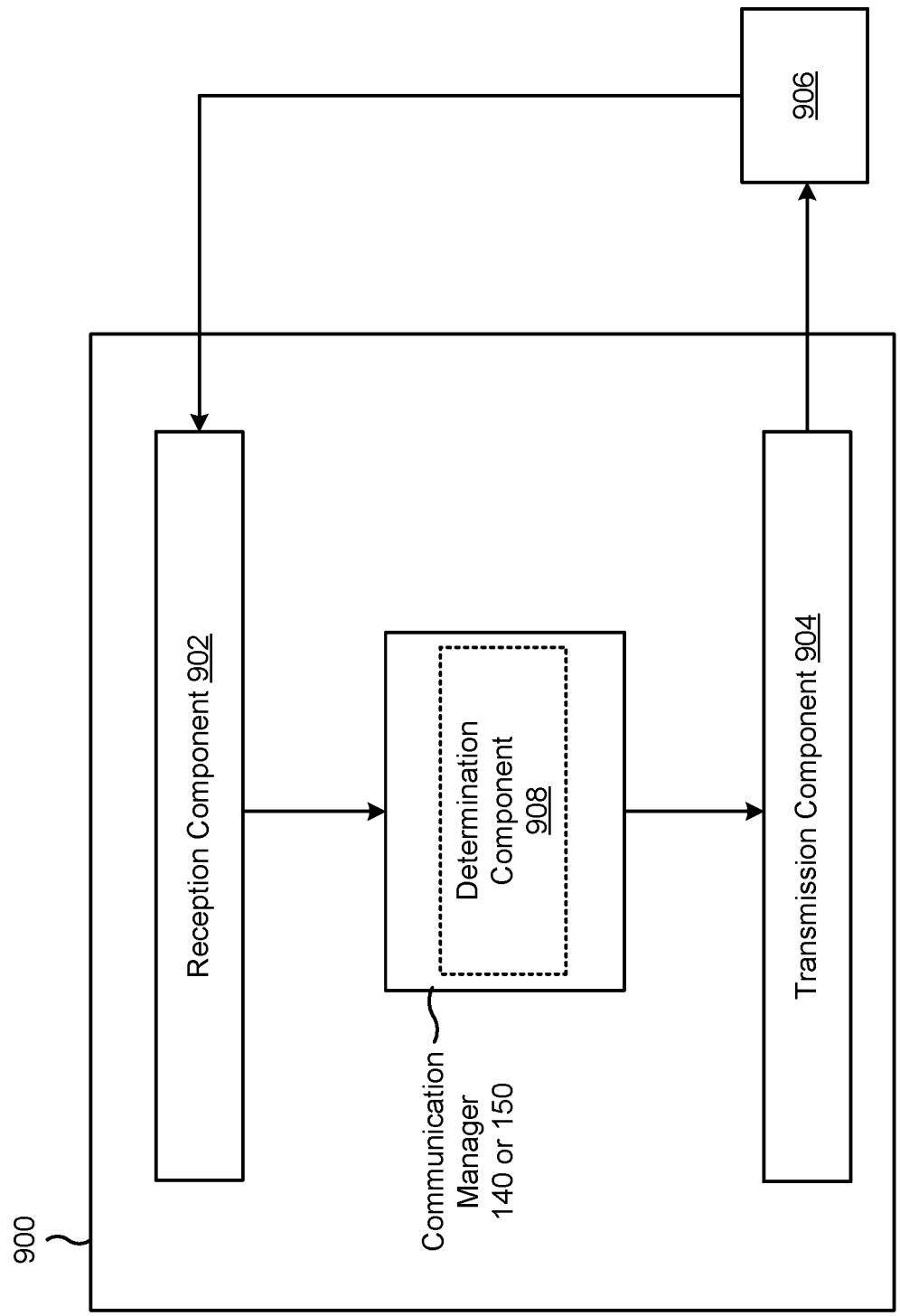
FIGS. 9 and 10 are block diagrams of example apparatuses for wireless communication, in accordance with the present disclosure.

FIG. 9 is a block diagram of an example apparatus 900 for wireless communication. The apparatus 900 may be a transmitter device, or a transmitter device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 1100 may include the communication manager 140 (e.g., if the transmitter device is a UE 120) or the communication manager 150 (e.g., if the transmitter device is a base station 110). The communication manager may include a determination component 908, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the transmitter device described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the transmitter device described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the transmitter device described above in connection with FIG. 2. In some aspects, the transmission component 904 may be co-located with the reception component 902 in a transceiver.

The transmission component 904 may transmit, to a receiver device, an initial message associated with a communication using a first code rate. The reception component 902 may receive, from the receiver device, first feedback information indicating that the communication was not successfully decoded by the receiver device. The transmission component 904 may transmit, to the receiver device based at least in part on the reception of the first feedback information, one or more retransmissions associated with the communication including a first retransmission, where the first retransmission includes a first number of bits from a set of bits associated with the communication, where the first number of bits lowers an effective code rate of the communication to a second code rate. The reception component 902 may receive, from the receiver device, second feedback information indicating that the communication was successfully decoded by the receiver device, where the effective code rate for the communication is based at least in part on a second number of bits included in the initial message and the first number of bits included in the first retransmission.

The reception component 902 may receive, from the receiver device, a channel state information report for the channel. The determination component 908 may estimate, based at least in part on the channel state information report, an achievable throughput for the channel. The determination component 908 may select the first code rate to be associated with a throughput that is greater than the estimated achievable throughput for the channel.

The determination component 908 may perform outer loop link adaptation to select the first code rate using a target block error rate that is associated with a value that is greater than a threshold value.

The transmission component 904 may transmit, to the receiver device, redundancy version information associated with retransmissions of the communication, wherein the redundancy version information indicates a size and a content of each retransmission associated with the communication.

The transmission component 904 may transmit, to the receiver device, redundancy version information indicating a size of the one or more retransmissions via a downlink control information message.

The transmission component 904 may transmit, to the receiver device, redundancy version information indicating a size of the one or more retransmissions relative to a size of the communication or a size of a previous retransmission.

The transmission component 904 may transmit, to the receiver device, redundancy version information indicating a redundancy version step size value associated with the one or more retransmissions that indicates a size of the one or more retransmissions via at least one of a downlink control information message, a radio resource control message, or a MAC-CE message.

The determination component 908 may determine a size of the one or more retransmissions based at least in part on a redundancy version step size value associated with the first retransmission.

The transmission component 904 may transmit, to the receiver device, an indication of the size of the one or more retransmissions.

The transmission component 904 may transmit, to the receiver device via downlink control information, redundancy version information indicating a content of the one or more retransmissions using a starting position of a number of bits associated with each retransmission included in the one or more retransmissions in a cyclic buffer.

The transmission component 904 may transmit, to the receiver device, an indication of the starting position vector via at least one of a downlink control information message, a radio resource control message, or a MAC-CE message.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
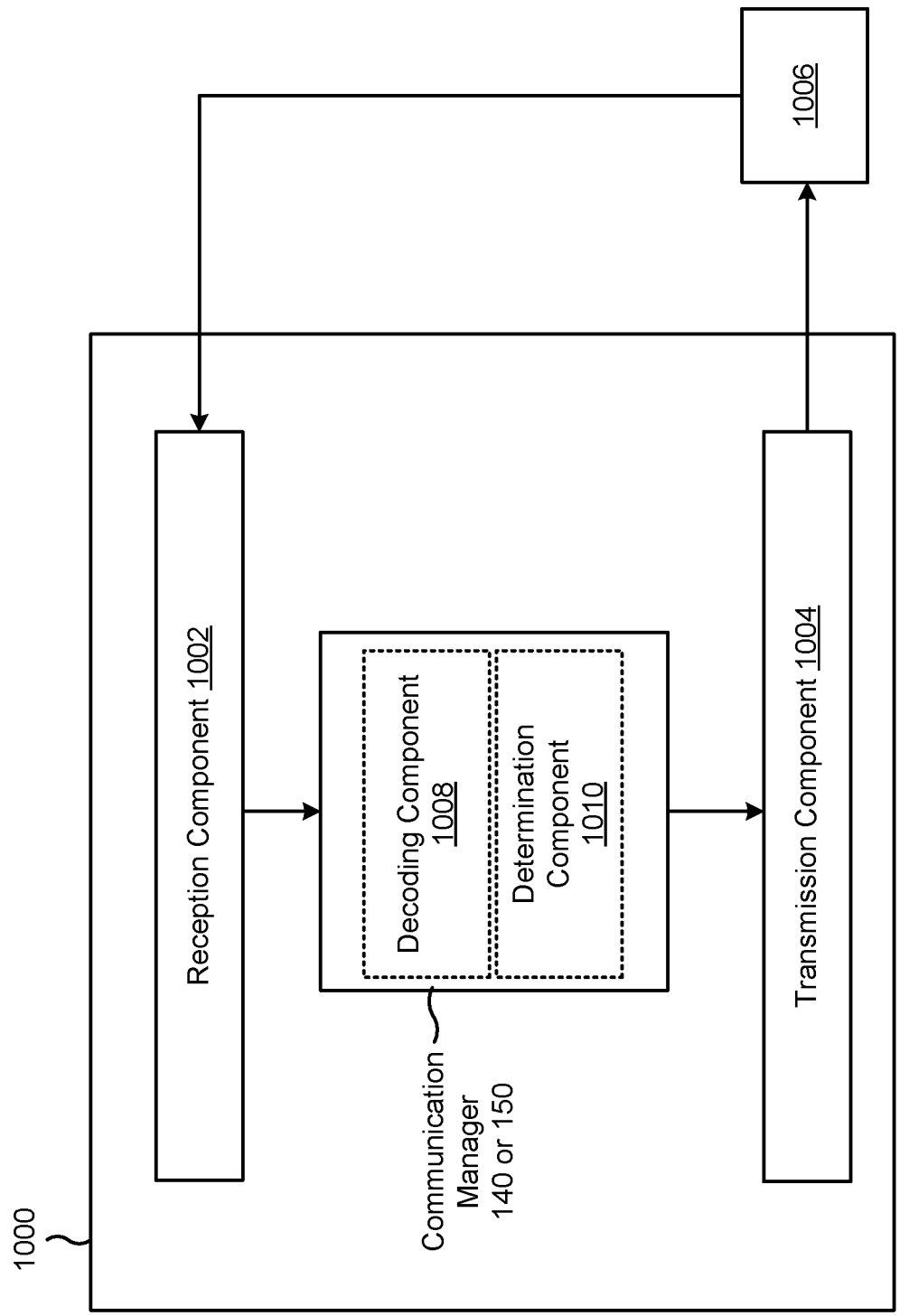

FIG. 10 is a block diagram of an example apparatus 1000 for wireless communication. The apparatus 1000 may be a receiver device, or a receiver device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1100 may include the communication manager 140 (e.g., if the receiver device is a UE 120) or the communication manager 150 (e.g., if the receiver device is a base station 110). The communication manager may include one or more of a decoding component 1008, and/or a determination component 1010, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the receiver device described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the receiver device described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the receiver device described above in connection with FIG. 2. In some aspects, the transmission component 1004 may be co-located with the reception component 1002 in a transceiver.

The reception component 1002 may receive, from a transmitter device, an initial message associated with a communication using a first code rate. The transmission component 1004 may transmit, to the transmitter device, first feedback information indicating that the communication was not successfully decoded by the receiver device. The reception component 1002 may receive, from the transmitter device based at least in part on the transmission of the first feedback information, one or more retransmissions associated with the communication including a first retransmission, where the first retransmission includes a first number of bits from a set of bits associated with the communication, where the first number of bits lowers an effective code rate of the communication to a second code rate. The transmission component 1004 may transmit, to the transmitter device, second feedback information indicating that the communication was successfully decoded by the receiver device, wherein the effective code rate for the communication is based at least in part on a second number of bits included in the initial message and the first number of bits included in the first retransmission.

The decoding component 1008 may attempt to decode the communication based at least in part on initial message of the communication that uses the first code rate. The decoding component 1008 may attempt to decode the communication based at least in part on the initial message and the first retransmission.

The reception component 1002 may receive, from the transmitter device, redundancy version information associated with retransmissions of the communication, wherein the redundancy version information indicates a size and a content of each retransmission associated with the communication.

The reception component 1002 may receive, from the transmitter device, redundancy version information indicating a size of the one or more retransmissions via a downlink control information message.

The reception component 1002 may receive, from the transmitter device, redundancy version information indicating a size of the one or more retransmissions relative to a size of the communication or a size of a previous retransmission.

The reception component 1002 may receive, from the transmitter device, redundancy version information indicating a redundancy version step size value associated with the one or more retransmissions that indicates a size of the one or more retransmissions via at least one of a downlink control information message, a radio resource control message, or a MAC-CE message.

The determination component 1010 may determine a size of the one or more retransmissions using a blind detection technique.

The reception component 1002 may receive, from the transmitter device via downlink control information, redundancy version information indicating a content of the one or more retransmissions using a starting position of a number of bits associated with each retransmission included in the one or more retransmissions in a cyclic buffer.

The reception component 1002 may receive, from the transmitter device, an indication of the starting position vector via at least one of a downlink control information message, a radio resource control message, or a MAC-CE message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a transmitter device, comprising: transmitting, to a receiver device, an initial message associated with a communication using a first code rate; receiving, from the receiver device, first feedback information indicating that the communication was not successfully decoded by the receiver device; transmitting, to the receiver device based at least in part on the reception of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and receiving, from the receiver device, second feedback information indicating that the communication was successfully decoded by the receiver device, wherein the effective code rate for the communication is based at least in part on a second number of bits included in the initial message and the first number of bits included in the first retransmission.

Aspect 2: The method of Aspect 1, wherein transmitting the one or more retransmissions associated with the communication comprises: receiving, from the receiver device after the transmission of the first retransmission, third feedback information indicating that the communication was not successfully decoded using the first retransmission; and transmitting, to the receiver device based at least in part on the reception of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, wherein the reception of the second feedback information indicating that the communication was successfully decoded is based at least in part on the transmission of the second retransmission, and wherein the effective code rate for the communication is based at least in part on the second number of bits included in the initial message, the first number of bits included the first retransmission, and the third number of bits included in the second retransmission.

Aspect 3: The method of any of Aspects 1-2, wherein receiving the first feedback information comprises at least one of: receiving feedback information for a transport block associated with the communication, receiving feedback information for a code block associated with the communication, or receiving feedback information for a code block group associated with the communication.

Aspect 4: The method of any of Aspects 1-3, wherein receiving the first feedback information comprises: receiving, from the receiver device, information indicating an allowable code rate for the communication.

Aspect 5: The method of any of Aspects 1-4, wherein transmitting the one or more retransmissions associated with the communication comprises at least one of: transmitting the first retransmission including the first number of bits for all code blocks of a transport block associated with the communication that was not successfully decoded by the receiver device, transmitting the first retransmission including the first number of bits for one or more code blocks associated with the communication that were not successfully decoded by the receiver device, or transmitting the first retransmission including the first number of bits for one or more code block groups associated with at least one code block that was not successfully decoded by the receiver device.

Aspect 6: The method of any of Aspects 1-5, further comprising: receiving, from the receiver device, a channel state information report for the channel; estimating, based at least in part on the channel state information report, an achievable throughput for the channel; and selecting the first code rate to be associated with a throughput that is greater than the estimated achievable throughput for the channel.

Aspect 7: The method of any of Aspects 1-6, further comprising: performing outer loop link adaption to select the first code rate using a target block error rate that is associated with a value that is greater than a threshold value.

Aspect 8: The method of any of Aspects 1-7, further comprising: transmitting, to the receiver device, redundancy version information associated with retransmissions of the communication, wherein the redundancy version information indicates a size and a content of each retransmission associated with the communication.

Aspect 9: The method of any of Aspects 1-8, further comprising: transmitting, to the receiver device, redundancy version information indicating a size of the one or more retransmissions via a downlink control information message.

Aspect 10: The method of any of Aspects 1-9, further comprising: transmitting, to the receiver device, redundancy version information indicating a size of the one or more retransmissions relative to a size of the communication or a size of a previous retransmission.

Aspect 11: The method of any of Aspects 1-10, wherein a size of the first retransmission is based at least in part on a redundancy version step size value associated with the first retransmission, wherein the redundancy version step size value indicates the first number of bits included in the first retransmission.

Aspect 12: The method of any of Aspects 1-11, further comprising: transmitting, to the receiver device, redundancy version information indicating a redundancy version step size value associated with the one or more retransmissions that indicates a size of the one or more retransmissions via at least one of a downlink control information message, a radio resource control message, or a medium access control (MAC) control element (MAC-CE) message.

Aspect 13: The method of any of Aspects 1-12, wherein a size of the one or more retransmissions is based at least in part on a redundancy version step size value that is based at least in part on a network status or an application associated with the communication.

Aspect 14: The method of any of Aspects 1-13, wherein a size of the one or more retransmissions is based at least in part on a redundancy version step size vector, wherein the redundancy version step size vector indicates redundancy version step size values for the one or more retransmissions.

Aspect 15: The method of Aspect 14, wherein the redundancy version step size vector indicates a first redundancy version step size value for the first retransmission and a second redundancy version step size value for a second retransmission.

Aspect 16: The method of any of Aspects 1-15, wherein a size of the one or more retransmissions is determined by the receiver device using a blind detection technique.

Aspect 17: The method of any of Aspects 1-16, further comprising: determining a size of the one or more retransmissions based at least in part on a redundancy version step size value associated with the first retransmission; and transmitting, to the receiver device, an indication of the size of the one or more retransmissions.

Aspect 18: The method of any of Aspects 1-17, further comprising: transmitting, to the receiver device via downlink control information, redundancy version information indicating a content of the one or more retransmissions using a starting position of a number of bits associated with each retransmission included in the one or more retransmissions in a cyclic buffer.

Aspect 19: The method of any of Aspects 1-18, wherein a starting position of a number of bits associated with each retransmission included in the one or more retransmissions in a cyclic buffer is based at least in part on a size of a previous transmission and a starting position of the previous transmission.

Aspect 20: The method of any of Aspects 1-19, wherein a starting position of a number of bits associated with each retransmission included in the one or more retransmissions in a cyclic buffer is based at least in part on a starting position vector, wherein the starting position vector indicates a starting position for the one or more retransmissions.

Aspect 21: The method of Aspect 20, further comprising: transmitting, to the receiver device, an indication of the starting position vector via at least one of a downlink control information message, a radio resource control message, or a medium access control (MAC) control element (MAC-CE) message.

Aspect 22: The method of any of Aspects 1-21, wherein the first code rate is associated with a first spectral efficiency or a first modulation and coding scheme (MCS) and the second code rate is associated with a second spectral efficiency or a second MCS.

Aspect 23: A method of wireless communication performed by a receiver device, comprising: receiving, from a transmitter device, an initial message associated with a communication using a first code rate; transmitting, to the transmitter device, first feedback information indicating that the communication was not successfully decoded by the receiver device; receiving, from the transmitter device based at least in part on the transmission of the first feedback information, one or more retransmissions associated with the communication including a first retransmission, wherein the first retransmission includes a first number of bits from a set of bits associated with the communication, wherein the first number of bits lowers an effective code rate of the communication to a second code rate; and transmitting, to the transmitter device, second feedback information indicating that the communication was successfully decoded by the receiver device, wherein the effective code rate for the communication is based at least in part on a second number of bits included in the initial message and the first number of bits included in the first retransmission.

Aspect 24: The method of Aspect 23, wherein receiving the one or more retransmissions comprises: transmitting, to the transmitter device after the transmission of the first retransmission, third feedback information indicating that the communication was not successfully decoded using the first retransmission; and receiving, from the transmitter device based at least in part on the transmission of the third feedback information, a second retransmission of the one or more retransmissions, wherein the second retransmission includes a third number of bits from the set of bits associated with the communication, wherein the third number of bits lowers the effective code rate of the communication from the second code rate to a third code rate, wherein the transmission of the second feedback information indicating that the communication was successfully decoded is based at least in part on the reception of the second retransmission, and wherein the effective code rate for the communication is based at least in part on the second number of bits included in the initial message, the first number of bits included the first retransmission, and the third number of bits included in the second retransmission.

Aspect 25: The method of any of Aspects 23-24, wherein transmitting the first feedback information comprises at least one of: transmitting feedback information for a transport block associated with the communication, transmitting feedback information for a code block associated with the communication, or transmitting feedback information for a code block group associated with the communication.

Aspect 26: The method of any of Aspects 23-25, wherein transmitting the first feedback information comprises: transmitting, to the transmitter device, information indicating an allowable code rate for the communication.

Aspect 27: The method of any of Aspects 23-26, wherein receiving the one or more retransmissions associated with the communication comprises at least one of: receiving the first retransmission including the first number of bits for all code blocks of a transport block associated with the communication that was not successfully decoded by the receiver device, receiving the first retransmission including the first number of bits for one or more code blocks associated with the communication that were not successfully decoded by the receiver device, or receiving the first retransmission including the first number of bits for one or more code block groups associated with at least one code block that was not successfully decoded by the receiver device.

Aspect 28: The method of any of Aspects 23-27, further comprising: receiving, from the transmitter device, redundancy version information associated with retransmissions of the communication, wherein the redundancy version information indicates a size and a content of each retransmission associated with the communication.

Aspect 29: The method of any of Aspects 23-28, further comprising: receiving, from the transmitter device, redundancy version information indicating a size of the one or more retransmissions via a downlink control information message.

Aspect 30: The method of any of Aspects 23-29, further comprising: receiving, from the transmitter device, redundancy version information indicating a size of the one or more retransmissions relative to a size of the communication or a size of a previous retransmission.

Aspect 31: The method of any of Aspects 23-30, wherein a size of the first retransmission is based at least in part on a redundancy version step size value associated with the first retransmission, wherein the redundancy version step size value indicates the first number of bits included in the first retransmission.

Aspect 32: The method of any of Aspects 23-31, further comprising: receiving, from the transmitter device, redundancy version information indicating a redundancy version step size value associated with the one or more retransmissions that indicates a size of the one or more retransmissions via at least one of a downlink control information message, a radio resource control message, or a medium access control (MAC) control element (MAC-CE) message.

Aspect 33: The method of any of Aspects 23-32, wherein a size of the one or more retransmissions is based at least in part on a redundancy version step size value that is based at least in part on a network status or an application associated with the communication.

Aspect 34: The method of any of Aspects 23-33, wherein a size of the one or more retransmissions is based at least in part on a redundancy version step size vector, wherein the redundancy version step size vector indicates redundancy version step size values for the one or more retransmissions.

Aspect 35: The method of Aspect 34, wherein the redundancy version step size vector indicates a first redundancy version step size value for the first retransmission and a second redundancy version step size value for a second retransmission.

Aspect 36: The method of any of Aspects 23-35, further comprising: determining a size of the one or more retransmissions using a blind detection technique.

Aspect 37: The method of any of Aspects 23-36, further comprising: receiving, from the transmitter device via downlink control information, redundancy version information indicating a content of the one or more retransmissions using a starting position of a number of bits associated with each retransmission included in the one or more retransmissions in a cyclic buffer.

Aspect 38: The method of any of Aspects 23-37, wherein a starting position of a number of bits associated with each retransmission included in the one or more retransmissions in a cyclic buffer is based at least in part on a size of a previous transmission and a starting position of the previous transmission.

Aspect 39: The method of any of Aspects 23-38, wherein a starting position of a number of bits associated with each retransmission included in the one or more retransmissions in a cyclic buffer is based at least in part on a starting position vector, wherein the starting position vector indicates a starting position for the one or more retransmissions.

Aspect 40: The method of Aspect 39, further comprising: receiving, from the transmitter device, an indication of the starting position vector via at least one of a downlink control information message, a radio resource control message, or a medium access control (MAC) control element (MAC-CE) message.

Aspect 41: The method of any of Aspects 23-40, wherein the first code rate is associated with a first spectral efficiency or a first modulation and coding scheme (MCS) and the second code rate is associated with a second spectral efficiency or a second MCS.

Aspect 42: The method of any of Aspects 23-41, wherein the first code rate is associated with a throughput that is greater than an estimated achievable throughput for the channel.

Aspect 43: An apparatus for wireless communication at a device, comprising a processor; memory coupled with the processor; and instructions stored in the memory and executable by the processor to cause the apparatus to perform the method of one or more of Aspects 1-22.

Aspect 44: A device for wireless communication, comprising a memory and one or more processors coupled to the memory, the memory and the one or more processors configured to perform the method of one or more of Aspects 1-22.

Aspect 45: An apparatus for wireless communication, comprising at least one means for performing the method of one or more of Aspects 1-22.

Aspect 46: A non-transitory computer-readable medium storing code for wireless communication, the code comprising instructions executable by a processor to perform the method of one or more of Aspects 1-22.

Aspect 47: A non-transitory computer-readable medium storing a set of instructions for wireless communication, the set of instructions comprising one or more instructions that, when executed by one or more processors of a device, cause the device to perform the method of one or more of Aspects 1-22.

Aspect 43: An apparatus for wireless communication at a device, comprising a processor; memory coupled with the processor; and instructions stored in the memory and executable by the processor to cause the apparatus to perform the method of one or more of Aspects 23-42.

Aspect 44: A device for wireless communication, comprising a memory and one or more processors coupled to the memory, the memory and the one or more processors configured to perform the method of one or more of Aspects 23-42.

Aspect 45: An apparatus for wireless communication, comprising at least one means for performing the method of one or more of Aspects 23-42.

Aspect 46: A non-transitory computer-readable medium storing code for wireless communication, the code comprising instructions executable by a processor to perform the method of one or more of Aspects 23-42.

Aspect 47: A non-transitory computer-readable medium storing a set of instructions for wireless communication, the set of instructions comprising one or more instructions that, when executed by one or more processors of a device, cause the device to perform the method of one or more of Aspects 23-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a transmitter device, comprising:
   transmitting, to a receiver device, an initial message associated with a communication using a first code rate that is an overestimated code rate that is greater than a determined code rate associated with a channel,
   wherein the first code rate is associated with a first spectral efficiency or a first modulation and coding scheme;
   receiving, from the receiver device, first feedback information indicating that the communication was not successfully decoded by the receiver device;
   transmitting, to the receiver device based at least in part on the reception of the first feedback information, one or more retransmissions associated with the communication including a first retransmission,
   wherein the first retransmission includes a first number of bits, from a set of bits associated with the communication, the first number of bits being for a code block or a code block group associated with at least one code block or at least one code block group that was not successfully decoded by the receiver device,
   wherein the first number of bits lowers an effective code rate of the communication to a second code rate that is associated with a second spectral efficiency or a second modulation and coding scheme, and
   wherein the first number of bits lowers the effective code rate of the communication to a next lower modulation and coding scheme according to modulation and coding scheme indices defined by a wireless communication standard; and
   receiving, from the receiver device, second feedback information indicating that the communication was successfully decoded by the receiver device,
   wherein the effective code rate for the communication is based at least in part on a second number of bits included in the initial message and the first number of bits included in the first retransmission.

2. The method of claim 1, wherein transmitting the one or more retransmissions associated with the communication comprises:
   receiving, from the receiver device after the transmission of the first retransmission, third feedback information indicating that the communication was not successfully decoded using the first retransmission; and
   transmitting, to the receiver device based at least in part on the reception of the third feedback information, a second retransmission of the one or more retransmissions,
   wherein the second retransmission includes a third number of bits from the set of bits associated with the communication,
   wherein the third number of bits lowers the effective code rate of the communication from the second code rate to a third code rate,
   wherein the reception of the second feedback information indicating that the communication was successfully decoded is based at least in part on the transmission of the second retransmission, and
   wherein the effective code rate for the communication is based at least in part on the second number of bits included in the initial message, the first number of bits included the first retransmission, and the third number of bits included in the second retransmission.

3. The method of claim 1, wherein receiving the first feedback information comprises at least one of:
   receiving feedback information for the code block associated with the communication, or
   receiving feedback information for the code block group associated with the communication.

4. The method of claim 1, wherein receiving the first feedback information comprises:
   receiving, from the receiver device, information indicating an allowable code rate for the communication.

5. The method of claim 1, further comprising:
   receiving, from the receiver device, a channel state information report for the channel;
   estimating, based at least in part on the channel state information report, an achievable throughput for the channel; and
   selecting the first code rate to be associated with a throughput that is greater than the estimated achievable throughput for the channel.

6. The method of claim 1, further comprising:
   performing outer loop link adaption to select the first code rate using a target block error rate that is associated with a value that is greater than a threshold value.

7. The method of claim 1, further comprising:
   transmitting, to the receiver device, redundancy version information associated with retransmissions of the communication,
   wherein the redundancy version information indicates a size and a content of each retransmission associated with the communication.

8. The method of claim 1, further comprising:
   transmitting, to the receiver device, redundancy version information indicating a size of the one or more retransmissions via a downlink control information message.

9. The method of claim 1, further comprising:
   transmitting, to the receiver device, redundancy version information indicating a size of the one or more retransmissions relative to a size of the communication or a size of a previous retransmission.

10. The method of claim 1, further comprising:
    transmitting, to the receiver device, redundancy version information indicating a redundancy version step size value associated with the one or more retransmissions that indicates a size of the one or more retransmissions via at least one of a downlink control information message, a radio resource control message, or a medium access control (MAC) control element (MAC-CE) message.

11. The method of claim 1, wherein a size of the one or more retransmissions is based at least in part on a redundancy version step size vector, wherein the redundancy version step size vector indicates redundancy version step size values for the one or more retransmissions.

12. The method of claim 1, further comprising:
determining a size of the one or more retransmissions based at least in part on a redundancy version step size value associated with the first retransmission; and
transmitting, to the receiver device, an indication of the size of the one or more retransmissions.

13. The method of claim 1, further comprising:
transmitting, to the receiver device via downlink control information a radio resource control message, or a medium access control (MAC) control element (MAC-CE) message, redundancy version information indicating a content of the one or more retransmissions using a starting position of a number of bits associated with each retransmission included in the one or more retransmissions in a cyclic buffer.

14. A transmitter device for wireless communication, comprising:
one or more memories; and
one or more processors, coupled to the one or more memories, configured to:
transmit, to a receiver device, an initial message associated with a communication using a first code rate that is an overestimated code rate that is greater t ha n a determined code rate associated with a channel,
wherein the first code rate is associated with a first spectral efficiency or a first modulation and coding scheme;
receive, from the receiver device, first feedback information indicating that the communication was not successfully decoded by the receiver device;
transmit, to the receiver device based at least in part on the reception of the first feedback information, one or more retransmissions associated with the communication including a first retransmission,
wherein the first retransmission includes a first number of bits, from a set of bits associated with the communication, the first number of bits being for a code block or a code block group associated with at least one code block or at least one code block group that was not successfully decoded by the receiver device,
wherein the first number of bits lowers an effective code rate of the communication to a second code rate that is associated with a second spectral efficiency or a second modulation and coding scheme, and
wherein the first number of bits lowers the effective code rate of the communication to a next lower modulation and coding scheme according to modulation and coding scheme indices defined by a wireless communication standard; and
receive, from the receiver device, second feedback information indicating that the communication was successfully decoded by the receiver device,
wherein the effective code rate for the communication is based at least in part on a second number of bits included in the initial message and the first number of bits included in the first retransmission.

15. The transmitter device of claim 14, wherein the one or more processors, to transmit the one or more retransmissions associated with the communication, are configured to:
receive, from the receiver device after the transmission of the first retransmission, third feedback information indicating that the communication was not successfully decoded using the first retransmission; and
transmit, to the receiver device based at least in part on the reception of the third feedback information, a second retransmission of the one or more retransmissions,
wherein the second retransmission includes a third number of bits from the set of bits associated with the communication,
wherein the third number of bits lowers the effective code rate of the communication from the second code rate to a third code rate,
wherein the reception of the second feedback information indicating that the communication was successfully decoded is based at least in part on the transmission of the second retransmission, and
wherein the effective code rate for the communication is based at least in part on the second number of bits included in the initial message, the first number of bits included the first retransmission, and the third number of bits included in the second retransmission.

16. The transmitter device of claim 14, wherein the one or more processors, to receive the first feedback information, are configured to:
receive feedback information for the code block associated with the communication, or
receive feedback information for the code block group associated with the communication.

17. The transmitter device of claim 14, wherein the one or more processors, to receive the first feedback information, are configured to:
receive, from the receiver device, information indicating an allowable code rate for the communication.

18. The transmitter device of claim 14, wherein the one or more processors are further configured to:
receive, from the receiver device, a channel state information report for the channel;
estimate, based at least in part on the channel state information report, an achievable throughput for the channel; and
select the first code rate to be associated with a throughput that is greater than the estimated achievable throughput for the channel.

19. The transmitter device of claim 14, wherein the one or more processors are further configured to:
perform outer loop link adaption to select the first code rate using a target block error rate that is associated with a value that is greater than a threshold value.

20. The transmitter device of claim 14, wherein the one or more processors are further configured to:
transmit, to the receiver device, redundancy version information associated with retransmissions of the communication,
wherein the redundancy version information indicates a size and a content of each retransmission associated with the communication.

21. The transmitter device of claim 14, wherein the one or more processors are further configured to:
transmit, to the receiver device, redundancy version information indicating a size of the one or more retransmissions via a downlink control information message.

22. The transmitter device of claim 14, wherein the one or more processors are further configured to:
transmit, to the receiver device, redundancy version information indicating a size of the one or more retransmissions relative to a size of the communication or a size of a previous retransmission.

23. The transmitter device of claim 14, wherein the one or more processors are further configured to:

transmit, to the receiver device, redundancy version information indicating a redundancy version step size value associated with the one or more retransmissions that indicates a size of the one or more retransmissions via at least one of a downlink control information message, a radio resource control message, or a medium access control (MAC) control element (MAC-CE) message.

24. The transmitter device of claim 14, wherein a size of the one or more retransmissions is based at least in part on a redundancy version step size vector,
wherein the redundancy version step size vector indicates redundancy version step size values for the one or more retransmissions.

25. The transmitter device of claim 14, wherein the one or more processors are further configured to:
determine a size of the one or more retransmissions based at least in part on a redundancy version step size value associated with the first retransmission; and
transmit, to the receiver device, an indication of the size of the one or more retransmissions.

26. The transmitter device of claim 14, wherein the one or more processors are further configured to:
transmit, to the receiver device via downlink control information a radio resource control message, or a medium access control (MAC) control element (MAC-CE) message, redundancy version information indicating a content of the one or more retransmissions using a starting position of a number of bits associated with each retransmission included in the one or more retransmissions in a cyclic buffer.

27. A non-transitory computer-readable medium storing a set of instructions for wireless communication, the set of instructions comprising:
one or more instructions that, when executed by one or more processors of a transmitter device, cause the transmitter device to:
transmit, to a receiver device, an initial message associated with a communication using a first code rate that is an overestimated code rate that is greater than a determined code rate associated with a channel,
wherein the first code rate is associated with a first spectral efficiency or a first modulation and coding scheme;
receive, from the receiver device, first feedback information indicating that the communication was not successfully decoded by the receiver device;
transmit, to the receiver device based at least in part on the reception of the first feedback information, one or more retransmissions associated with the communication including a first retransmission,
wherein the first retransmission includes a first number of bits, from a set of bits associated with the communication, the first number of bits being for a code block or a code block group associated with at least one code block or at least one code block group that was not successfully decoded by the receiver device,
wherein the first number of bits lowers an effective code rate of the communication to a second code rate that is associated with a second spectral efficiency or a second modulation and coding scheme, and
wherein the first number of bits lowers the effective code rate of the communication to a next lower modulation and coding scheme according to modulation and coding scheme indices defined by a wireless communication standard; and
receive, from the receiver device, second feedback information indicating that the communication was successfully decoded by the receiver device,
wherein the effective code rate for the communication is based at least in part on a second number of bits included in the initial message and the first number of bits included in the first retransmission.

28. The non-transitory computer-readable medium of claim 27, wherein the one or more instructions to receive the first feedback information, when executed by the one or more processors, further cause the transmitter device to:
receive feedback information for the code block associated with the communication, or
receive feedback information for the code block group associated with the communication.

29. An apparatus for wireless communication, comprising:
means for transmitting, to a receiver device, an initial message associated with a communication using a first code rate that is an overestimated code rate that is greater than a determined code rate associated with a channel,
wherein the first code rate is associated with a first spectral efficiency or a first modulation and coding scheme;
means for receiving, from the receiver device, first feedback information indicating that the communication was not successfully decoded by the receiver device;
means for transmitting, to the receiver device based at least in part on the reception of the first feedback information, one or more retransmissions associated with the communication including a first retransmission,
wherein the first retransmission includes a first number of bits, from a set of bits associated with the communication, the first number of bits being for a code block or a code block group associated with at least one code block or at least one code block group that was not successfully decoded by the receiver device,
wherein the first number of bits lowers an effective code rate of the communication to a second code rate that is associated with a second spectral efficiency or a second modulation and coding scheme, and
wherein the first number of bits lowers the effective code rate of the communication to a next lower modulation and coding scheme according to modulation and coding scheme indices defined by a wireless communication standard; and
means for receiving, from the receiver device, second feedback information indicating that the communication was successfully decoded by the receiver device,
wherein the effective code rate for the communication is based at least in part on a second number of bits included in the initial message and the first number of bits included in the first retransmission.

* * * * *